United States Patent
Lee et al.

(10) Patent No.: US 10,331,366 B2
(45) Date of Patent: Jun. 25, 2019

(54) METHOD OF OPERATING DATA STORAGE DEVICE AND METHOD OF OPERATING SYSTEM INCLUDING THE SAME

(71) Applicant: Samsung Electronics Co., Ltd., Suwon-si, Gyeonggi-do (KR)

(72) Inventors: Jung Pil Lee, Hwaseong-si (KR); Seok Won Ahn, Suwon-si (KR); Hyun Ju Yi, Hwaseong-si (KR); Jun Ho Choi, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 28 days.

(21) Appl. No.: 15/075,217

(22) Filed: Mar. 21, 2016

(65) Prior Publication Data
US 2016/0306579 A1    Oct. 20, 2016

(30) Foreign Application Priority Data

Apr. 17, 2015 (KR) ............ 10-2015-0054197

(51) Int. Cl.
*G06F 3/06* (2006.01)

(52) U.S. Cl.
CPC .......... *G06F 3/0625* (2013.01); *G06F 3/0634* (2013.01); *G06F 3/0688* (2013.01); *Y02D 10/154* (2018.01)

(58) Field of Classification Search
CPC .... G06F 3/0653; G06F 3/0673; G06F 3/0625; G06F 3/0634
USPC ........................................ 711/156
See application file for complete search history.

(56) References Cited

U.S. PATENT DOCUMENTS

| | | | |
|---|---|---|---|
| 8,078,894 B1 | 12/2011 | Ogami | |
| 8,386,818 B2 | 2/2013 | Hong | |
| 8,458,497 B2 | 6/2013 | Du et al. | |
| 8,583,947 B2 | 11/2013 | Byom et al. | |
| 2010/0057904 A1 | 3/2010 | Nagamori | |
| 2011/0093733 A1 | 4/2011 | Kruglick | |
| 2011/0219171 A1* | 9/2011 | Kuehne | G06F 12/00 711/103 |
| 2011/0239009 A1* | 9/2011 | Noda | G06F 13/385 713/300 |
| 2011/0258354 A1 | 10/2011 | Wang | |
| 2012/0265949 A1 | 10/2012 | Shimizu | |
| 2013/0198437 A1* | 8/2013 | Omizo | G06F 12/0246 711/103 |
| 2014/0071767 A1* | 3/2014 | MacCarrone | G11C 16/0483 365/185.21 |

(Continued)

FOREIGN PATENT DOCUMENTS

| | | |
|---|---|---|
| KR | 1135313 | 4/2012 |
| KR | 1280792 | 6/2013 |

*Primary Examiner* — Hua J Song
(74) *Attorney, Agent, or Firm* — Volentine, Whitt & Francos, PLLC

(57) ABSTRACT

A method of operating a data storage device configured to allow a plurality of non-volatile memory devices, including a first non-volatile memory device and second non-volatile memory devices, to lead control of power consumption. The method includes receiving, by each of the second non-volatile memory devices, a state signal indicating operation or non-operation of the first non-volatile memory device and determining, by each of the second non-volatile memory device, whether to operate based on the state signal.

14 Claims, 14 Drawing Sheets

(56) References Cited

U.S. PATENT DOCUMENTS

2015/0206593 A1* 7/2015 Khandelwal ........ G11C 11/5628
  365/185.22

* cited by examiner

METHOD OF OPERATING DATA STORAGE DEVICE AND METHOD OF OPERATING SYSTEM INCLUDING THE SAME

CROSS-REFERENCE TO RELATED APPLICATION

This application claims priority under 35 U.S.C. § 119(a) from Korean Patent Application No. 10-2015-0054197 filed on Apr. 17, 2015, the disclosure of which is hereby incorporated by reference in its entirety.

BACKGROUND

Embodiments of the disclosure relate to a method of operating a data storage device, and more particularly, to a method of operating a data storage device by which each of non-volatile memory devices controls its own operation or non-operation and a method of operating a system including the data storage device.

With the increase in use of portable communication devices, data traffic among electronic circuits in a portable communication device has increased. Since a lot of tasks occur in a portable communication device including flash memory devices in order to manage the operations of the flash memory devices, the workload of a central processing unit (CPU) or processor that generates and manages the tasks increases. In addition, when simultaneous operations (e.g., write or read operations) on flash memory devices occur, maximum instantaneous power consumption increases in a portable communication device including the flash memory devices.

When maximum instantaneous power consumed by flash memory devices at a time is higher than power supplied by a power management integrated circuit (IC) in a portable communication device including the flash memory devices and the power management IC, an error may occur in a power supply unit that supplies power to the portable communication device, and therefore, the portable communication device may not operate normally.

Scale-up or scale-out is used to increase the data processing performance of a data storage device, e.g. a data server. Scale-up is a method of increasing the data processing performance of a data server by increasing the capacity of the data server itself and is referred to as vertical scaling. Scale-out is a method of increasing the data processing performance of a system including a data server by increasing the number of connected data servers and is referred to as horizontal scaling.

When the number of non-volatile memory devices increases in a data storage device having scale-up architecture, loading capacitance of an interface between the non-volatile memory devices and a controller which controls the non-volatile memory devices increases. As a result, the data processing speed of the data storage device may decrease.

SUMMARY

According to some embodiments of the disclosure, there is provided a method of operating a data storage device which controls a plurality of non-volatile memory devices including a first non-volatile memory device and second non-volatile memory devices. The method includes receiving, by each of the second non-volatile memory devices, a state signal indicating operation or non-operation of the first non-volatile memory device and determining, by the each of the second non-volatile memory devices, whether to operate based on the state signal.

The state signal may be generated by the first non-volatile memory device. The state signal may indicate the order in which the second non-volatile memory devices operate. The state signal may indicate a number of non-volatile memory devices that can be operated at the same time among the plurality of non-volatile memory devices. The state signal may be transmitted to the each of the second non-volatile memory devices through a dedicated channel.

The method may further include receiving, by a power management control circuit included in the data storage device, an operation indication signal output from the first non-volatile memory device, generating, by the power management control circuit, the state signal based on the operation indication signal, and transmitting, by the power management control circuit, the state signal to each of the second non-volatile memory devices.

The generating the state signal may include counting, by the power management control circuit, the number of receptions of the operation indication signal and generating a count value of this number and comparing, by the power management control circuit, the count value with a reference value and generating the state signal having a state determined by the comparison result.

The power management control circuit may generate the state signal for maintaining the second non-volatile memory devices in an idle state when the count value becomes the same as the reference value as the operation indication signal is activated. The power management control circuit may generate the state signal indicating a start of operation of one of the second non-volatile memory devices when the count value becomes less than the reference value as the operation indication signal is deactivated.

The state signal may determine the order in which the second non-volatile memory devices operate.

At least one of the non-volatile memory devices may include a plurality of non-volatile memory chips and a controller configured to access and manage the non-volatile memory chips.

According to other embodiments of the disclosure, there is provided a method of operating a data processing system which includes a data storage device controlling a plurality of non-volatile memory devices, including a first non-volatile memory device and second non-volatile memory devices, and a host which controls an operation of the data storage device. The method includes the first non-volatile memory device generating a state signal and each of the second non-volatile memory devices determining at least one between whether to operate and an operation order based on the state signal.

The method may further include generating, by a power management control circuit included in the first non-volatile memory device, the state signal based on an operation indication signal received from a controller of the first non-volatile memory device, the operation indication signal indicating a request to perform either a program operation or a read operation. The power management control circuit may send the state signal to the each of the second non-volatile memory devices through a dedicated channel.

The generating the state signal may include the power management control circuit counting reception of the operation indication signal to generate a count value, comparing the count value with a reference value, and generating the state signal having a state determined by the comparison result.

The power management control circuit may generate the state signal for maintaining the second non-volatile memory devices in an idle state when the count value becomes the same as the reference value as the operation indication signal is activated. The power management control circuit may generate the state signal indicating a start of operation of one of the second non-volatile memory devices when the count value becomes less than the reference value as the operation indication signal is deactivated.

At least one of the non-volatile memory devices may include a plurality of non-volatile memory chips and a controller configured to access and manage the non-volatile memory chips.

According to other embodiments of the disclosure, there is provided a method executed by a power management control circuit. The method includes receiving, from each of a plurality of first non-volatile memory devices, a first state signal indicating that the each of the plurality of first non-volatile memory devices has a pending read or program operation to perform; and outputting an operation inhibit signal to a second non-volatile memory device when the number of received first state signals exceeds a threshold value, the operation inhibit signal indicating that the second non-volatile memory device is inhibited from performing a read or program operation.

The method may further include decrementing the number of received first state signals by one for every second state signal received from the first non-volatile memory devices indicating that one of the first non-volatile memory devices has completed its read or program operation.

The method may further include outputting an operation control signal indicating which of the first non-volatile memory devices is permitted to perform its pending read or program operation.

The operation control signal may indicate the sequence in which multiple ones of the first non-volatile memory devices are permitted to perform their pending read or program operations.

The method may further include outputting an operation enable signal to the second non-volatile memory device when the number of received first state signals does not exceed the threshold value, the operation enable signal indicating that the second non-volatile memory device is permitted to perform its read or program operation.

BRIEF DESCRIPTION OF THE DRAWINGS

The above and other features and advantages of the disclosure will become more apparent by describing in detail exemplary embodiments thereof with reference to the attached drawings in which.

DETAILED DESCRIPTION OF THE EMBODIMENTS

Figure 1:
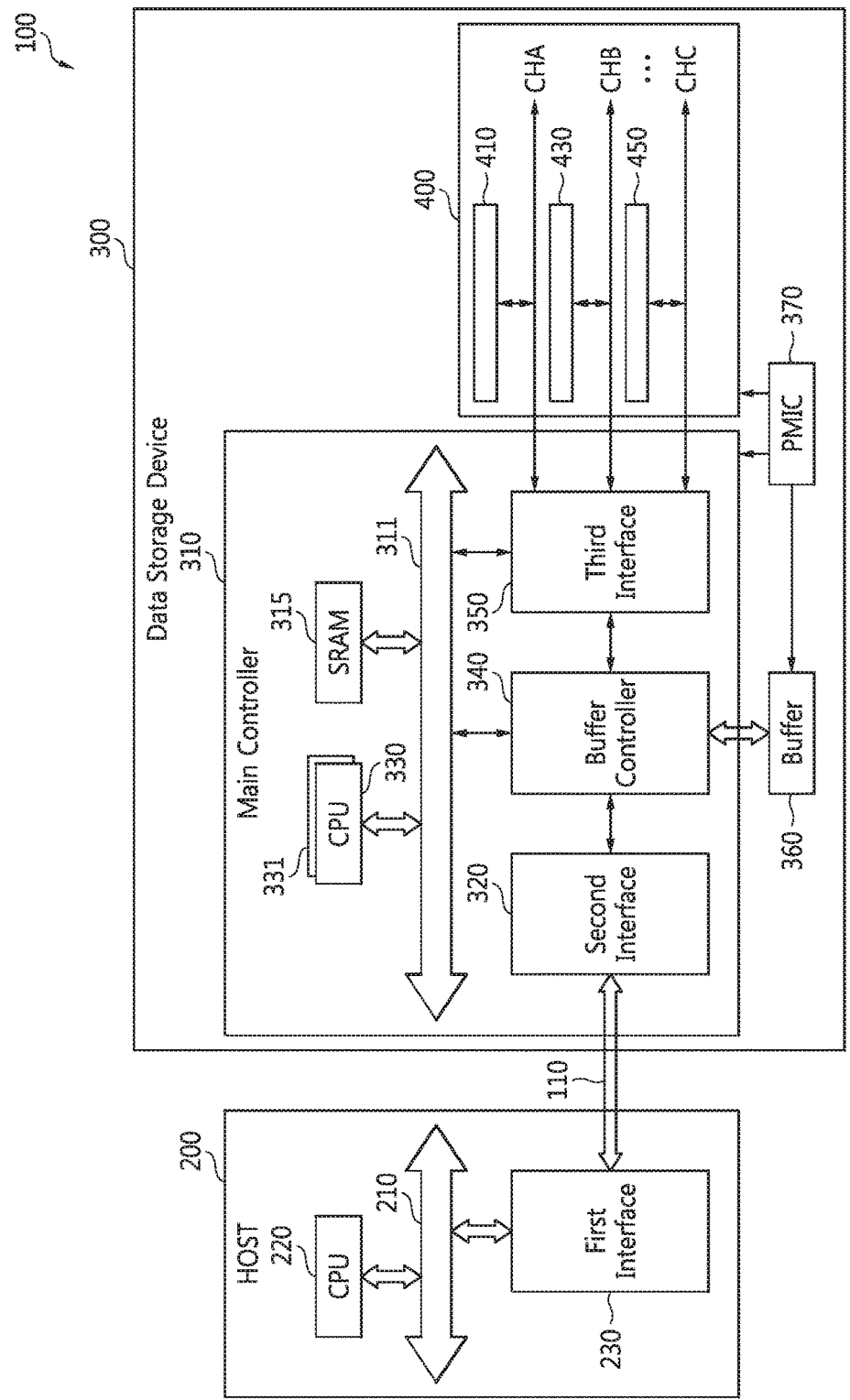
FIG. 1 is a block diagram of a data processing system according to some embodiments of the disclosure.

Embodiments will be described more fully hereinafter with reference to the accompanying drawings, in which particular embodiments are shown. Embodiments may, however, take many different forms and should not be construed as limited to the particular embodiments set forth herein. Rather, these embodiments are provided so that this disclosure will be thorough and complete, and will fully convey the scope to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc., may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a data processing system 100 according to some embodiments of the disclosure. The data processing system 100 may include a host 200 and a data storage device 300 which communicates a command and/or data with the host 200 via an interface 110.

The data storage device 300 including a memory cluster 400 allows the memory cluster 400 or non-volatile memory devices included in the memory cluster 400 to lead the control of maximum instantaneous power consumption of the data storage device 300 without control (or intervention) of a main controller 310. When the memory cluster 400 included in the data storage device 300 has a structure illustrated in FIG. 9, the data storage device 300 may have scale-out architecture.

The data processing system 100 may be a memory system. The data processing system 100 including the memory cluster 400 may be implemented as a personal computer (PC), a workstation, a data center, an internet data center (IDC), a storage area network (SAN), a network-attached storage (NAS), or a mobile computing device, but the disclosure is not restricted to the current embodiments. A mobile computing device including the memory cluster 400 may be implemented as a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, a drone, or an e-book.

The interface 110 may be a serial advanced technology attachment (SATA) interface, a SATA express (SATAe) interface, a SAS (serial attached small computer system interface (SCSI)), a peripheral component interconnect express (PCIe) interface, a non-volatile memory express (NVMe) interface, an advanced host controller interface (AHCI), or a multimedia card (MMC) interface but is not restricted thereto. The interface 110 may transmit electrical or optical signals.

The host 200 may control a data processing operation (e.g., a write or read operation) of the data storage device 300 via the interface 110. The host 200 may refer to a host controller. A central processing unit (CPU) 220 and a first interface 230 may communicate a command and/or data with each other via bus architecture 210. Although the host 200 includes the bus architecture 210, the CPU 220, and the first interface 230 in the embodiments illustrated in FIG. 1, the disclosure is not restricted to the host 200 illustrated in FIG. 1. The host 200 may be implemented as an integrated circuit (IC), a motherboard, a system on chip (SoC), an application processor (AP), a mobile AP, a web server, a data server, or a database server, but the disclosure is not restricted to these examples.

The bus architecture 210 may be implemented as an advanced microcontroller bus architecture (AMBA), an advanced high-performance bus (AHB), an advanced peripheral bus (APB), an advanced extensible interface (AXI), an advanced system bus (ASB), AXI coherency extensions (ACE), or a combination thereof, but the disclosure is not restricted to these examples.

The CPU 220 may generate a write request for controlling a write operation of the data storage device 300 or a read request for controlling a read operation of the data storage device 300. The write request may include a write address and the read request may include a read address. The CPU 220 may include at least one core. The request may refer to a command.

The first interface 230 may change the format of a command and/or data to be transmitted to the data storage device 300 and may transmit the command and/or data in a changed format to the data storage device 300 through the interface 110. The first interface 230 may also change the format of a response and/or data received from the data storage device 300 and may transmit the response and/or data in a changed format to the CPU 220 through the bus architecture 210. The first interface 230 may include a transceiver which transmits and receives a command and/or data. The structure and operations of the first interface 230 may be configured to be compatible with those of the interface 110.

The data storage device 300 may include a main controller 310, a buffer 360, a power management IC (PMIC) 370, and the memory cluster 400. The memory cluster 400 may be a group of memories. The memory cluster 400 may include scale-out devices and memories.

The data storage device 300 may be a flash-based memory device but is not restricted thereto. The data storage device 300 may be implemented as a solid-state drive or solid-state disk (SSD), an embedded SSD (eSSD), a universal flash storage (UFS), an MMC, an embedded MMC (eMMC), or managed NAND, but the disclosure is not restricted to these examples. The flash-based memory device may be a NAND-type flash memory device or a NOR-type flash memory device.

Alternatively, the data storage device 300 may be implemented as a hard disk drive (HDD), a phase-change random access memory (PRAM) device, a magnetoresistive RAM (MRAM) device, a spin-transfer torque MRAM (STT-MRAM) device, a ferroelectric RAM (FRAM) device, or a resistive RAM (RRAM) device, but the disclosure is not restricted to these examples.

The main controller 310 may control transfer or process of a command and/or data among the host 200, the buffer 360, and the memory cluster 400. The main controller 310 may be implemented in an IC or an SoC.

The main controller 310 may include bus architecture 311, an internal memory 315, a second interface 320, at least one CPU 330 and/or 331, a buffer controller 340, and a third interface 350. The bus architecture 311 may be implemented as AMBA, AHB, APB, AXI, ASB, ACE, or a combination thereof, but the disclosure is not restricted to these examples.

The internal memory 315 may store data necessary for the operations of the main controller 310 or data generated from a data processing operation (e.g. a write or read operation) performed by the main controller 310. The internal memory 315 may store a first flash translation layer (FTL) code that can be executed by the CPU 330 and/or 331. When the data storage device 300 is booted, the first FTL code may be loaded from the memory cluster 400 to the internal memory 315. The internal memory 315 may be implemented as RAM, dynamic RAM (DRAM), static RAM (SRAM), buffer, buffer memory, cache, or tightly couple memory (TCM) but is not restricted to these examples.

The second interface 320 may change the format of a response and/or data to be transmitted to the host 200 and may transmit the response and/or data in a changed format to the host 200 through the interface 110. The second interface 320 may also receive a command and/or data from the host 200, change the format of the command and/or data, and transmit the command and/or data in a changed format to the at least one CPU 330 and/or 331 and/or the buffer controller 340. The second interface 320 may include a transceiver which transmits and receives a signal and/or data.

The structure and operations of the second interface 320 may be configured to be compatible with those of the interface 110. The second interface 320 may be SATA interface, SATAe interface, SAS, PCIe interface, NVMe interface, AHCI, MMC interface, NAND-type flash memory interface, or NOR-type flash memory interface but is not restricted thereto.

The at least one CPU 330 and/or 331 may control the internal memory 315, the second interface 320, the buffer controller 340, and the third interface 350 through the bus architecture 311. The at least one CPU 330 and/or 331 may include at least one core. The at least one CPU 330 and/or 331 may control the PMIC 370.

The first CPU 330 may communicate data with the host 200 via the second interface 320 and the second CPU 331 may communicate data with the memory cluster 400 via the third interface 350. The first CPU 330 and the second CPU 331 may form a multi-CPU. The first CPU 330 may control the second CPU 331, but the disclosure is not restricted to the current embodiments.

The buffer controller 340 may write data to or read data from the buffer 360 according to the control of the first or second CPU 330 or 331. The buffer controller 340 may control the write and read operations on the buffer 360. It may be called a buffer manager.

The third interface 350 may control a data processing operation (e.g. a write or read operation) on the memory cluster 400 through one of main channels CHA, CHB, and CHC according to the control of the first or second CPU 330 or 331. The third interface 350 may be SATA interface, SATAe interface, SAS, PCIe interface, NVMe interface, AHCI, MMC interface, NAND-type flash memory interface, or NOR-type flash memory interface but is not restricted thereto.

The third interface 350 may include an error correction code (ECC) engine (not shown). The ECC engine may correct errors in data to be stored in the memory cluster 400 and/or data output from the memory cluster 400. The ECC engine may be implemented at any place in the main controller 310.

The buffer 360 may write or read data according to the control of the buffer controller 340. The buffer 360 may be implemented as volatile memory such as buffer memory, RAM, SRAM, or DRAM, but the disclosure is not restricted to these examples.

The buffer 360 may include a first region which stores a mapping table for logical address-to-physical address translation with respect to a plurality of clusters 410, 430, and 450; and a second region which functions as a cache, but the disclosure is not restricted to the current embodiments. The first FTL code executed by the at least one CPU 330 and/or 331 may perform logical address-to-physical address translation using the mapping table stored in the first region.

When the main controller 310 and the buffer 360 are formed in different chips, respectively; the main controller 310 and the buffer 360 may be implemented in a single package using package-on-package (PoP), multi-chip package (MCP), or system-in package (SiP), but the disclosure is not restricted to these examples. A first chip including the buffer 360 may be stacked above a second chip including the main controller 310 using stack balls.

The PMIC 370 may control operating voltages applied to the main controller 310, the buffer 360, and/or the memory cluster 400. The operating voltage applied to the main controller 310, the operating voltage applied to the buffer 360, and the operating voltage applied to the memory cluster 400 may be the same as or different from one another.

The memory cluster 400 may include a plurality of the clusters 410, 430, and 450. The first cluster 410 may be connected to the first main channel CHA, the second cluster 430 may be connected to the second main channel CHB, and the third cluster 450 may be connected to the third main channel CHC. The structure of each of the clusters 410, 430, and 450 will be described in detail with reference to FIG. 2, FIGS. 4 through 6, FIG. 8, and/or FIG. 9. Each of the clusters 410, 430, and 450 may include a plurality of non-volatile memory devices or a package including a plurality of non-volatile memory devices.

Here, a main channel may refer to an independent data path existing between the main controller 310 or the third interface 350 and a cluster. The data path may include transmission lines that transmit data and/or control signals. The term "way" may refer to a non-volatile memory device or a group of non-volatile memory devices sharing one main channel. Accordingly, a plurality of ways may be connected to one main channel. A non-volatile memory device may refer to a die, a memory device, or a package. The main controller 310 may control A-channel*B-way, where A and B are natural numbers of at least 1.

Figure 2:
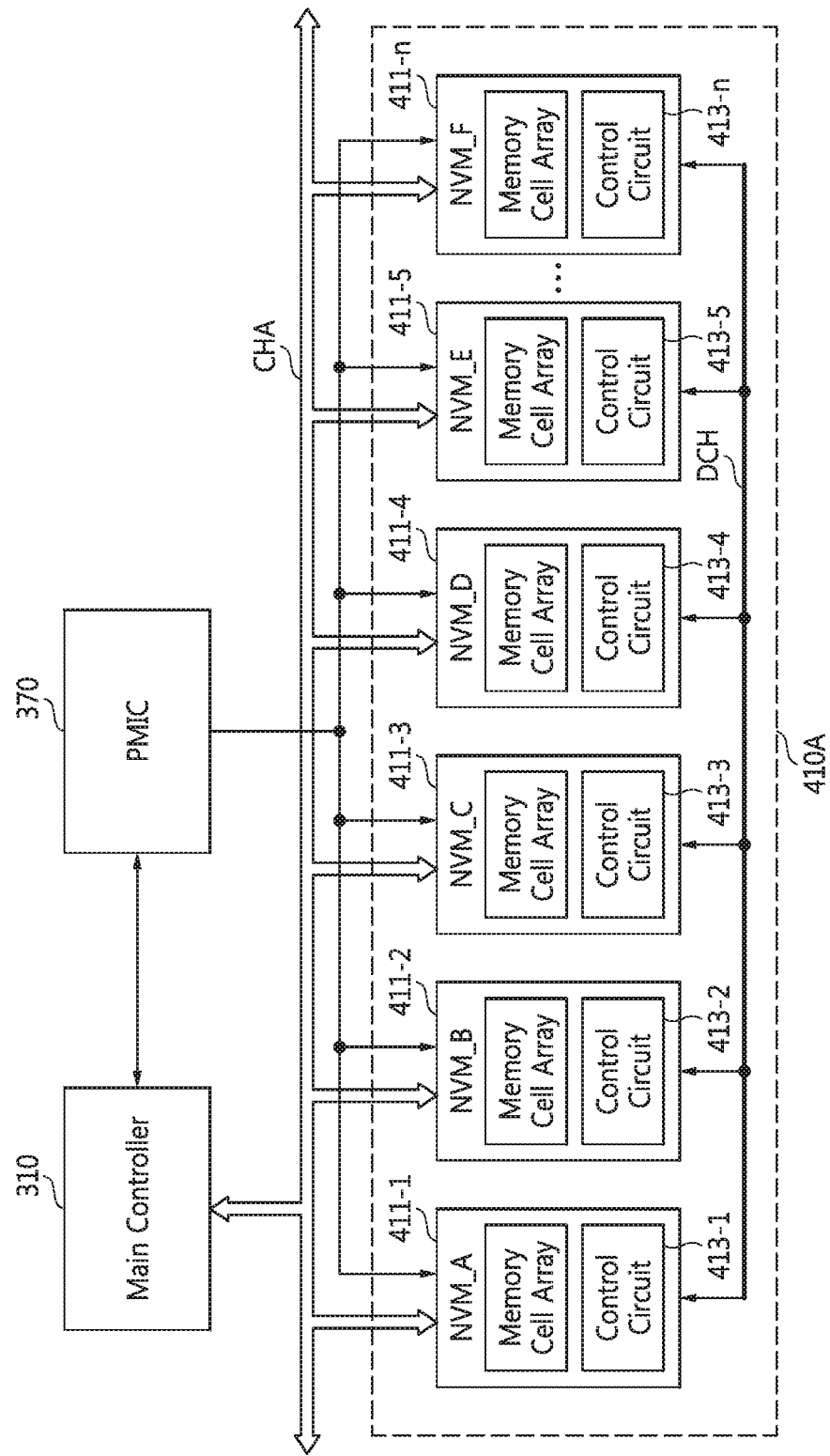
FIG. 2 is a block diagram of an example of a first cluster illustrated in FIG. 1.

FIG. 2 is a block diagram of an example 410A of the first cluster 410 illustrated in FIG. 1. The main controller 310 and the PMIC 370 are illustrated together with the first cluster 410A in FIG. 2 for clarity of the description. The clusters 410, 430, and 450 have the same or similar structures, and therefore, the structure and operations of the first cluster 410A are illustrated and described representatively.

The main controller 310 may control the operations of non-volatile memory devices 411-1 through 411-n, where "n" is a natural number of at least 6. The PMIC 370 may supply an operating voltage or power to each of the non-volatile memory devices 411-1 through 411-n.

The non-volatile memory devices 411-1 through 411-n may include memory cell arrays, respectively, and control circuits 413-1 through 413-n, respectively. Each memory cell array may include a plurality of memory cells. For instance, each memory cell array may include a two-dimensional (2D) or three-dimensional (3D) memory cell array.

The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array. In an embodiment of the present disclosure, the 3D memory array includes vertical NAND strings that are vertically oriented such that at least one memory cell is located over another memory cell. The at least one memory cell may comprise a charge trap layer. The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

One of the non-volatile memory devices 411-1 through 411-n may send or receive state information (or a "state signal") to or from each of the other non-volatile memory devices through a dedicated channel (or a "dedicated operation control channel") DCH. The dedicated channel DCH may be a channel different than the first main channel CHA. Here, a channel may refer to at least one signal line that transmits information, signal, or data.

State information output from each of the non-volatile memory devices 411-1 through 411-n may be information (or a signal) that indicates the operation state of each of the non-volatile memory devices 411-1 through 411-n. The operation state may refer to a write operation or a read operation but is not restricted thereto.

The first non-volatile memory device 411-1 which is currently operating may output state information through the dedicated channel DCH. Each of the remaining second non-volatile memory devices 411-2 through 411-n may detect that the first non-volatile memory device 411-1 is currently operating based on the state information. Each of the second non-volatile memory devices 411-2 through 411-n which are not currently operating may determine whether to start an operation based on the state information from the first non-volatile memory device 411-1.

Figure 3:
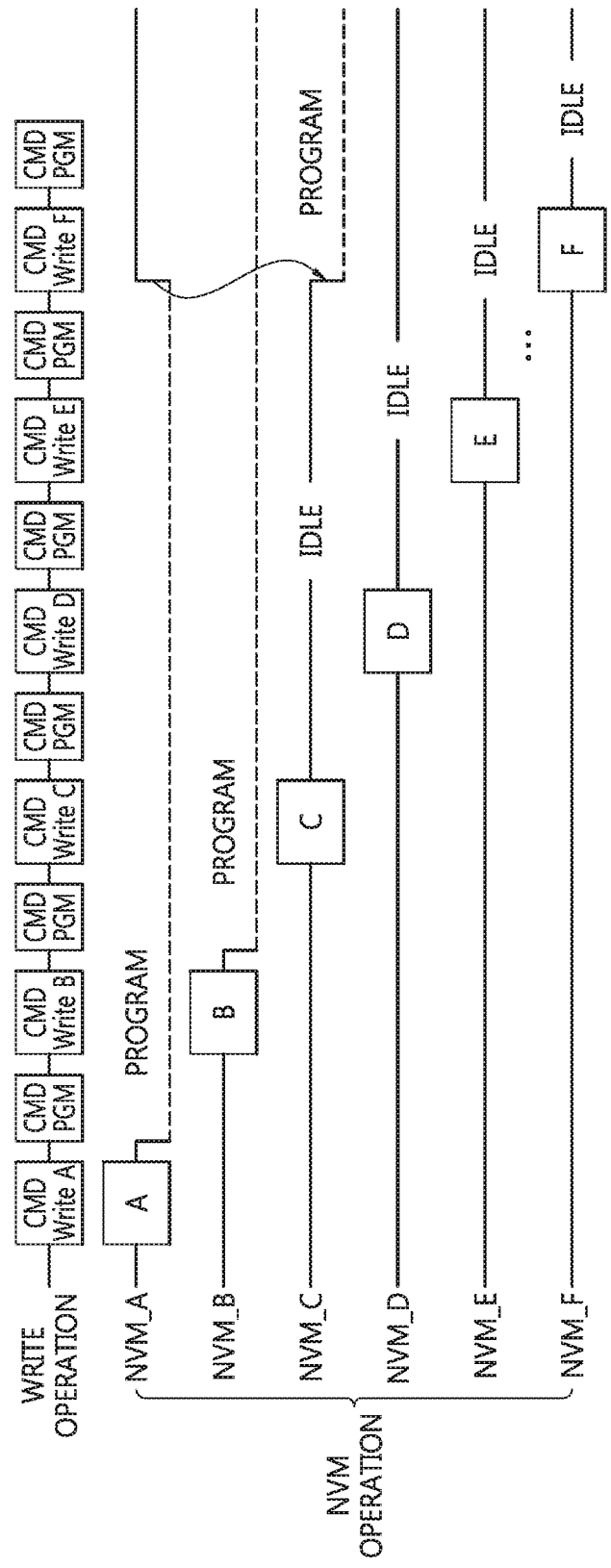
FIG. 3 is a timing chart showing the operation of the first cluster illustrated in FIG. 2.

FIG. 3 is a timing chart showing the operation of the first cluster 410A illustrated in FIG. 2. Referring to FIGS. 1 through 3, it is assumed that maximum power that the PMIC 370 of the data storage device 300 is able to supply (for a program operation) is the same as power consumed when program operations are performed simultaneously (or in parallel) in two non-volatile memory devices among the non-volatile memory devices 411-1 through 411-n. At this time, it is assumed that a maximum value of 2 of the non-volatile memory devices 411-1 through 411-n are managed by the control circuits 413-1 through 413-n in the respective non-volatile memory devices 411-1 through 411-n and this value is stored in a memory (not shown) or register (not shown) which can be accessed (or managed) by each of the control circuits 413-1 through 413-n. The maximum value of 2 is provided as an example for clarity of the description and the disclosure is not restricted to this value of 2.

A write operation (or a program operation) performed on each of the non-volatile memory devices 411-1 through 411-n is illustrated in FIG. 3. However, the disclosure is not restricted to the write operation and may also be applied to a read operation or other operations performed on the non-volatile memory devices 411-1 through 411-n.

The CPU 330 or 331 of the main controller 310 may store a maximum value corresponding to the maximum power that the PMIC 370 is able to supply in a memory (not shown) or register (not shown) that can be managed by each of the control circuits 413-1 through 413-n. The memory or register may be implemented in the non-volatile memory device 411-1. The maximum value may refer to the number of non-volatile memory devices that can be operated simultaneously or in parallel.

Referring to FIGS. 2 and 3, when the main controller 310 transmits a write command "CMD Write A" including data A to the first non-volatile memory device NVM_A or 411-1 through the first main channel CHA, the first control circuit 413-1 of the first non-volatile memory device NVM_A may store the data A in a data buffer (not shown) of the first non-volatile memory device NVM_A. Thereafter, when the main controller 310 transmits a program command, e.g., a program confirm command "CMD PGM" to the first non-volatile memory device NVM_A through the first main channel CHA, the first control circuit 413-1 may program the data A that has been stored in the data buffer of the first non-volatile memory device NVM_A to a memory cell array of the first non-volatile memory device NVM_A.

While a program operation is being performed in the first non-volatile memory device NVM_A, the first control circuit 413-1 may transmit a first state signal indicating that the program operation is currently being performed in the first non-volatile memory device NVM_A to the other non-volatile memory devices NVM_B through NVM_F through the dedicated channel DCH. The control circuits 413-2 through 413-n of the respective non-volatile memory devices NVM_B through NVM_F may count the reception of the first state signal. At this time, the control circuits 413-2 through 413-n may change a count value from "0" to "1". The control circuits 413-2 through 413-n may determine that the program operation is being performed in the first non-volatile memory device NVM_A based on the first state signal.

Continuing, when the main controller 310 transmits a write command "CMD Write B" including data B to the second non-volatile memory device NVM_B or 411-2 through the first main channel CHA, the second control circuit 413-2 of the second non-volatile memory device NVM_B may store the data B in a data buffer (not shown) of the second non-volatile memory device NVM_B. Thereafter, when the main controller 310 transmits a program command, e.g., the program confirm command "CMD PGM" to the second non-volatile memory device NVM_B through the first main channel CHA, the second control circuit 413-2 may program the data B that has been stored in the data buffer of the second non-volatile memory device NVM_B to a memory cell array of the second non-volatile memory device NVM_B.

While a program operation is being performed in the second non-volatile memory device NVM_B, the second control circuit 413-2 may transmit a second state signal indicating that the program operation is currently being performed in the second non-volatile memory device NVM_B to the other non-volatile memory devices NVM_A and NVM_C through NVM_F through the dedicated channel DCH.

The control circuits 413-1 and 413-3 through 413-n of the respective non-volatile memory devices NVM_A and NVM_C through NVM_F may count the reception of the second state signal. In detail, the control circuits 413-3 through 413-n may change the count value from "1" to "2" and the first control circuit 413-1 may change a count value from "0" to "1". The control circuits 413-1 and 413-3 through 413-n may determine that the program operation is being performed in the second non-volatile memory device NVM_B based on the second state signal.

From the point of view of each of the non-volatile memory devices NVM_C through NVM_F, the control circuits 413-3 through 413-n of the respective non-volatile memory devices NVM_C through NVM_F may determine that the program operation is being performed in the non-volatile memory devices NVM_A and NVM_B based on the first and second state signals received through the dedicated channel DCH.

When the main controller 310 transmits a write command "CMD Write C" including data C to the third non-volatile memory device NVM_C through the first main channel CHA, the third control circuit 413-3 of the third non-volatile memory device NVM_C may store the data C in a data buffer (not shown) of the third non-volatile memory device NVM_C. Thereafter, when the main controller 310 transmits a program command, e.g., the program confirm command "CMD PGM" to the third non-volatile memory device NVM_C through the first main channel CHA, the third control circuit 413-3 does not program the data C that has been stored in the data buffer of the third non-volatile memory device NVM_C to a memory cell array of the third non-volatile memory device NVM_C, but remains in an idle state because it has determined that the program operations are being performed in the non-volatile memory devices NVM_A and NVM_B. In other words, the third non-volatile memory device NVM_C may remain in the idle state based on the count value of 2.

When the program operation is completed in the first non-volatile memory device NVM_A while the third non-volatile memory device NVM_C is remaining in the idle state, the first control circuit 413-1 of the first non-volatile memory device NVM_A may transmit the first state signal indicating the completion of the program operation to the other non-volatile memory devices NVM_B through NVM_F through the dedicated channel DCH. The control circuits 413-3 through 413-n of the respective non-volatile memory devices NVM_C through NVM_F may change the count value from "2" to "1" in response to the first state signal indicating the completion of the program operation. And the control circuit 413-2 of the respective non-volatile memory device NVM_B may change the count value from "1" to "0" in response to the first state signal indicating the completion of the program operation.

Accordingly, the third control circuit 413-3 of the third non-volatile memory device NVM_C may program the data C that has been stored in the data buffer of the third non-volatile memory device NVM_C to the memory cell array of the third non-volatile memory device NVM_C in response to the count value of "1" and the program command, i.e., the program confirm command "CMD PGM". At this time, the third control circuit 413-3 may transmit a third state signal indicating that a program operation is being performed in the third non-volatile memory device NVM_C to the other non-volatile memory devices NVM_A, NVM_B, and NVM_D through NVM_F through the dedicated channel DCH.

The control circuits 413-1, 413-2, and 413-4 through 413-n of the respective non-volatile memory devices NVM_A, NVM_B, and NVM_D through NVM_F may count the reception of the third state signal. In other words, the control circuits 413-1 and 413-4 through 413-n may change the count value from "1" to "2" and the control circuit 413-2 may change the count value from "0" to "1".

While the program operation is performed in both of the second and third non-volatile memory devices NVM_B and NVM_C simultaneously or in parallel, no program operation is performed in the other non-volatile memory devices NVM_A and NVM_D through NVM_F. A write command "CMD Write D" is to write data D to the fourth non-volatile memory device NVM_D. A write command "CMD Write E" is to write data E to the fifth non-volatile memory device NVM_E. A write command "CMD Write F" is to write data F to the n-th non-volatile memory device NVM_F. When the program operation is completed in the second non-volatile memory device NVM_B, a program operation may be performed in one of the non-volatile memory devices NVM_D through NVM F.

In other words, while a program operation is being performed simultaneously or in parallel in two non-volatile memory devices among a plurality of the non-volatile memory devices NVM_A through NVM_F, a program operation is not performed in the non-volatile memory devices other than the two and these non-volatile memory devices remain in the idle state.

As described above, a currently operating non-volatile memory device among the non-volatile memory devices NVM_A through NVM_F may transmit state information indicating operation or non-operation to the other non-volatile memory devices through the dedicated channel DCH. Although the state information is transmitted through the dedicated channel DCH in the embodiments illustrated in FIG. 2, the design may be changed so that the state information may be transmitted through the first main channel CHA in other embodiments. The state information output from the non-volatile memory devices NVM_A through NVM_F may include information (or a "signal") that determines the order in which the non-volatile memory devices NVM_A through NVM_F are operated in some embodiments. The state information may include information determining the number of non-volatile memory devices that can be operated at a time among the non-volatile memory devices NVM_A through NVM_F in other embodiments.

Although the non-volatile memory devices NVM_A through NVM_F connected to the first main channel CHA communicate state information with one another in the embodiments illustrated in FIG. 2, each of the non-volatile memory devices NVM_A through NVM_F connected to the first main channel CHA may communicate state information with non-volatile memory devices connected to any one of the other main channels CHB and CHC. In other words, one of the non-volatile memory devices connected to the first main channel CHA and one of the non-volatile memory devices connected to another main channel CHB or CHC may operate simultaneously or in parallel in the memory cluster 400. Since one (e.g., a first non-volatile memory device) of non-volatile memory devices included in the memory cluster 400 communicates state information with the other non-volatile memory devices (e.g., second non-volatile memory devices), the memory cluster 400 can manage maximum instantaneous power without control or intervention of the main controller 310.

As described above, the state information may be used to determine whether each of non-volatile memory devices included in the memory cluster 400 is operating, the order in which the non-volatile memory devices operate, and/or a maximum number of non-volatile memory devices that can be operated at a time. In FIG. 3, "NVM OPERATION" denotes a program operation and an idle state.

Figure 4:
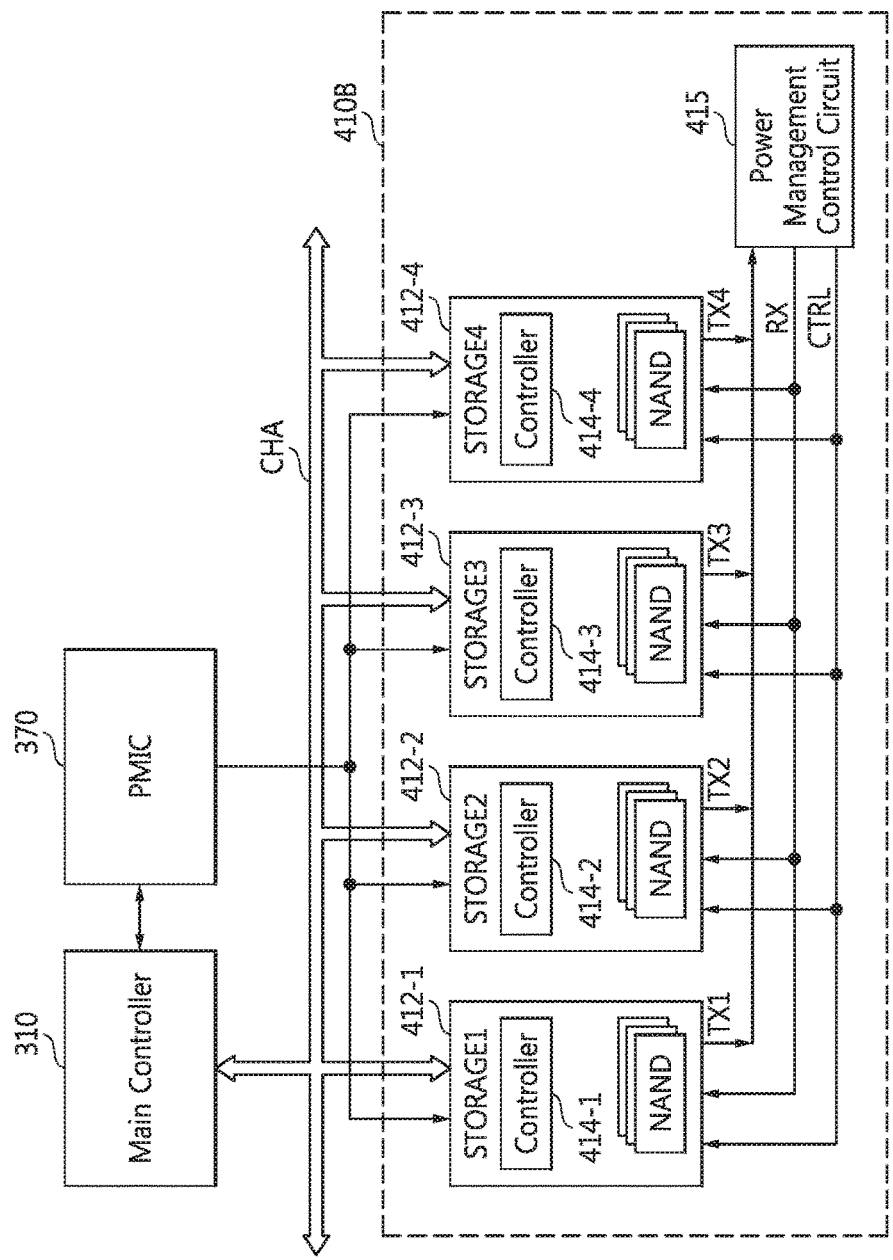
FIG. 4 is a block diagram of another example of the first cluster illustrated in FIG. 1.
Figure 5:
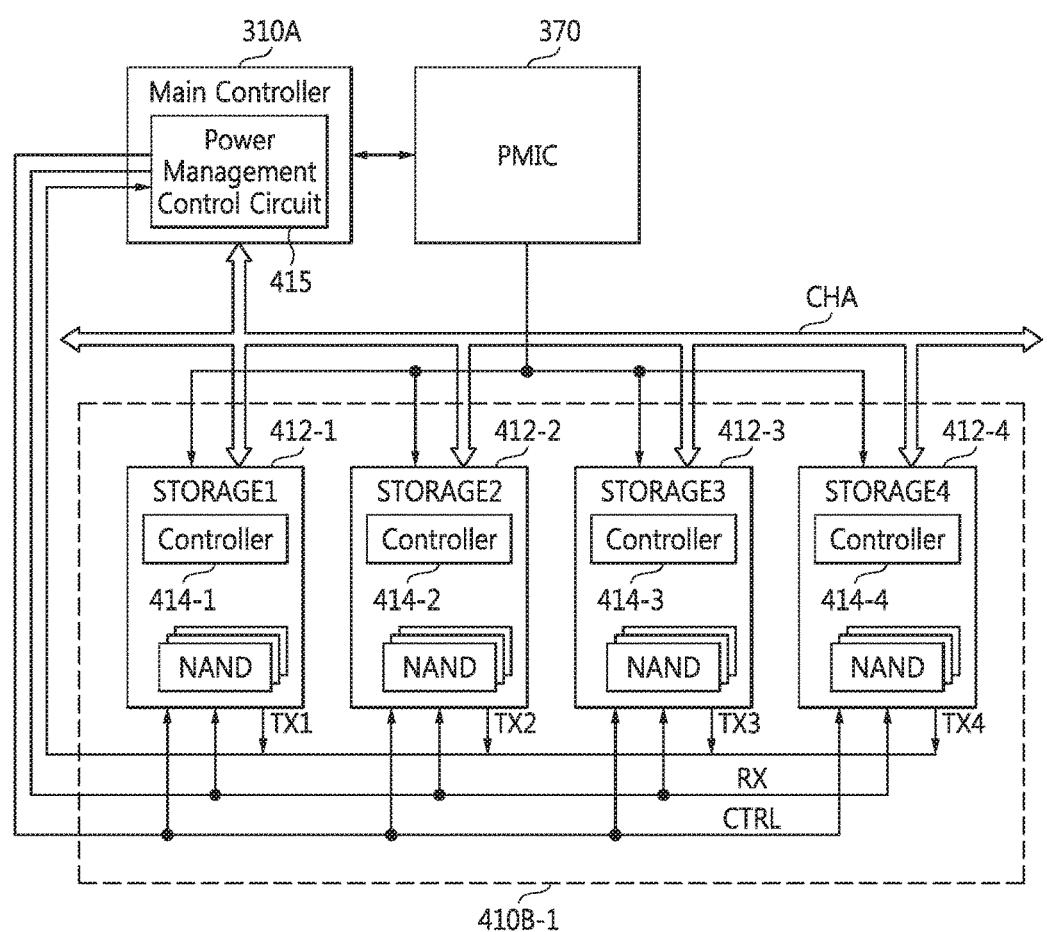
FIG. 5 is a block diagram of still another example of the first cluster illustrated in FIG. 1.
Figure 6:
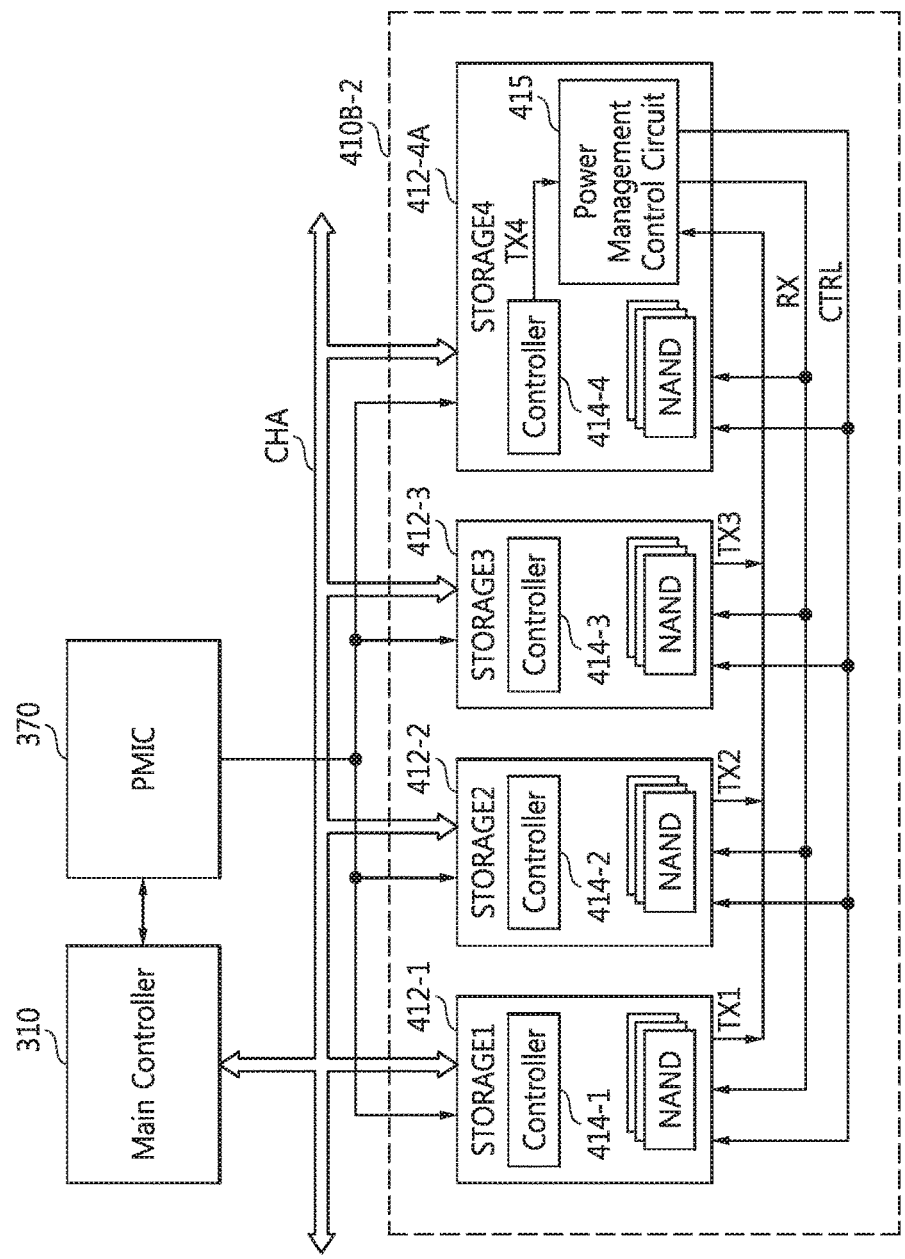
FIG. 6 is a block diagram of yet another example of the first cluster illustrated in FIG. 1.
Figure 7:
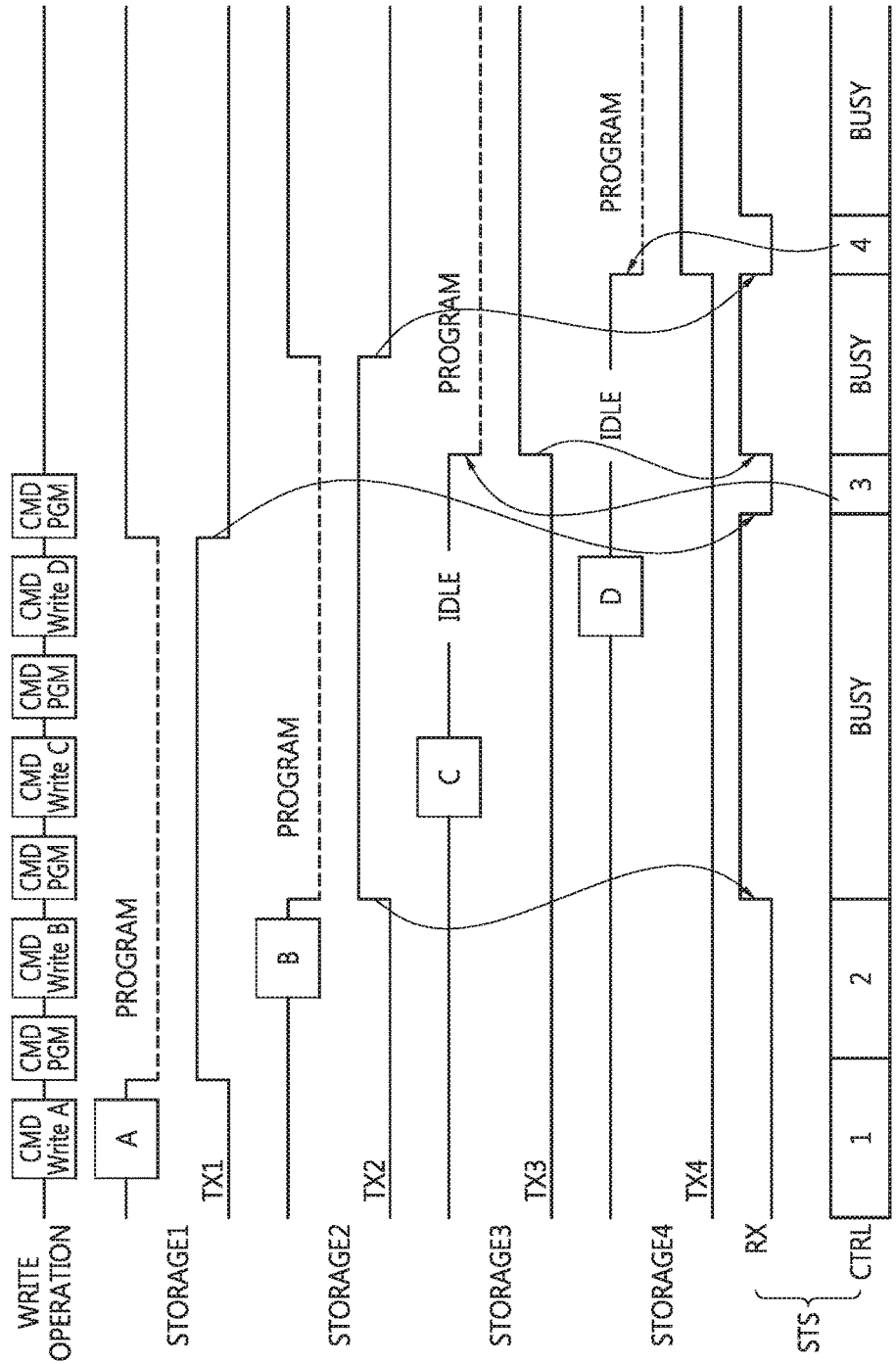
FIG. 7 is a timing chart showing the operation of the first cluster illustrated in FIG. 4, 5, or 6.

FIG. 4 is a block diagram of another example 410B of the first cluster 410 illustrated in FIG. 1. FIG. 5 is a block diagram of still another example 410B-1 of the first cluster 410 illustrated in FIG. 1. FIG. 6 is a block diagram of yet another example 410B-2 of the first cluster 410 illustrated in FIG. 1. FIG. 7 is a timing chart showing the operation of the first cluster 410B, 410B-1, or 410B-2 illustrated in FIG. 4, 5, or 6.

Referring to FIGS. 1, 4, and 7, each of non-volatile memory devices 412-1 through 412-4 included in the first cluster 410B may be a managed non-volatile memory device, e.g., a managed NAND flash memory device or a managed NAND flash memory package. Each of the managed non-volatile memory devices 412-1 through 412-4 may include non-volatile memory chips (e.g., NAND flash memory chips) NAND and a controller 414-1, 414-2, 414-3, or 414-4 which accesses and manages the non-volatile memory chips NAND. The controllers 414-1 through 414-4 may perform memory management functions (such as wear leveling and bad block management). Each of the controllers 414-1 through 414-4 may include an ECC engine which detects and corrects data errors.

The main controller 310 and the PMIC 370 are illustrated together with the first cluster 410B in FIG. 4 for clarity of the description. The clusters 410, 430, and 450 illustrated in FIG. 1 have substantially the same or similar structures, and therefore, the structure and operations of the first cluster 410B are illustrated and described representatively.

The main controller 310 may control the operations of the non-volatile memory devices 412-1 through 412-4 through the first main channel CHA. Although four non-volatile memory devices 412-1 through 412-4 are illustrated in FIG. 4 for clarity of the description, the disclosure is not restricted to the number of the non-volatile memory devices 412-1 through 412-4 included in the first cluster 410B. The PMIC 370 may supply an operating voltage (or power) to the main controller 310 and the non-volatile memory devices 412-1 through 412-4.

The first cluster 410B may include the non-volatile memory devices 412-1 through 412-4 and a power management control circuit 415. Referring to FIG. 4, it is assumed that maximum power that the PMIC 370 of the data storage device 300 is able to supply (for a program operation) is the same as the power consumed when program operations are performed simultaneously in two of the non-volatile memory devices 412-1 through 412-4. At this time, it is assumed that a maximum value or a reference value is 2. In addition, it is assumed that the first non-volatile memory device STORAGE1 or 412-1 operates first in response to a control signal CTRL. As shown in FIG. 7, the control signal CTRL is assumed to control the order in which the non-volatile memory devices STORAGE1 through STORAGE4 operate.

Referring to FIGS. 4 and 7, when the main controller 310 transmits the write command "CMD Write A" including the data A to the first non-volatile memory device STORAGE1 through the first main channel CHA, the first controller 414-1 of the first non-volatile memory device STORAGE1 may store the data A in a data buffer (not shown) of the first non-volatile memory device STORAGE1. Thereafter, when the main controller 310 transmits a program command, e.g., the program confirm command "CMD PGM" to the first non-volatile memory device STORAGE1, the first controller 414-1 may program the data A that has been stored in the data buffer of the first non-volatile memory device STORAGE1 to a memory cell array included in one of the memory chips NAND included in the first non-volatile memory device STORAGE1.

While the data A is being programmed, the first controller 414-1 may output a first operation indication signal TX1 activated to indicate that the program operation is currently being performed in the first non-volatile memory device STORAGE1 to the power management control circuit 415. The power management control circuit 415 may transmit an operation control signal RX deactivated and the control signal CTRL to the non-volatile memory devices STORAGE1 through STORAGE4 in response to the first operation indication signal TX1 activated.

When the main controller 310 transmits the write command "CMD Write B" including the data B to the second non-volatile memory device STORAGE2 or 412-2 through the first main channel CHA while the program operation is being performed in the first non-volatile memory device STORAGE1, the second controller 414-2 of the second non-volatile memory device STORAGE2 may store the data B in a data buffer (not shown) of the second non-volatile memory device STORAGE2. The program operation may be performed in the second non-volatile memory device STORAGE2 according to the control signal CTRL.

Thereafter, when the main controller 310 transmits a program command, e.g., the program confirm command "CMD PGM" to the second non-volatile memory device STORAGE2 through the first main channel CHA, the second controller 414-2 may program the data B that has been stored in the data buffer of the second non-volatile memory device STORAGE2 to a memory cell array included in one of the memory chips NAND included in the second non-volatile memory device STORAGE2.

While the data B is being programmed, the second controller 414-2 may output a second operation indication signal TX2 activated to indicate that the program operation is currently being performed in the second non-volatile memory device STORAGE2 to the power management control circuit 415. The power management control circuit 415 may transmit the operation control signal RX activated to the non-volatile memory devices STORAGE1 through STORAGE4 in response to the second operation indication signal TX2 activated. In other words, when the maximum value or the reference value is 2, the power management control circuit 415 may generate the operation control signal RX activated in response to the first operation indication signal TX1 activated and the second operation indication signal TX2 activated. At this time, the power management control circuit 415 may transmit the control signal CTRL indicating "busy" to the non-volatile memory devices STORAGE1 through STORAGE4.

When the main controller 310 transmits the write command "CMD Write C" including the data C to the third non-volatile memory device STORAGE3 through the first main channel CHA, the third controller 414-3 of the third non-volatile memory device STORAGE3 may store the data C in a data buffer (not shown) of the third non-volatile memory device STORAGE3.

Thereafter, when the main controller 310 transmits a program command, e.g., the program confirm command "CMD PGM" to the third non-volatile memory device STORAGE3 through the first main channel CHA, the third controller 414-3 does not program the data C that has been stored in the data buffer of the third non-volatile memory device STORAGE3 to a memory cell array included in one of the memory chips NAND included in the third non-volatile memory device STORAGE3, but remains in the idle state in response to the operation control signal RX activated and/or the control signal CTRL indicating "busy".

When the program operation is completed in the first non-volatile memory device STORAGE1, the first controller 414-1 of the first non-volatile memory device STORAGE1 may output the first operation indication signal TX1 deactivated to indicate the completion of the program operation to the power management control circuit 415. The power management control circuit 415 may transmit the operation control signal RX deactivated and the control signal CTRL for controlling the start of the operation of the third non-volatile memory device STORAGE3 to the non-volatile memory devices STORAGE1 through STORAGE4 in response to the first operation indication signal TX1 deactivated.

The third controller 414-3 of the third non-volatile memory device STORAGE3 may program the data C that has been stored in the data buffer of the third non-volatile memory device STORAGE3 to the memory cell array included in one of the memory chips NAND included in the third non-volatile memory device STORAGE3 in response to the operation control signal RX deactivated and the control signal CTRL for controlling the start of the operation of the third non-volatile memory device STORAGE3. While the data C is being programmed, the third controller 414-3 may output a third operation indication signal TX3 activated to indicate that the program operation is being performed in the third non-volatile memory device STORAGE3 to the power management control circuit 415.

The power management control circuit 415 may transmit the operation control signal RX activated to the non-volatile memory devices STORAGE1 through STORAGE4 in response to the third operation indication signal TX3 activated. In other words, when the maximum value or the reference value is 2, the power management control circuit 415 may generate the operation control signal RX activated in response to the second operation indication signal TX2 activated and the third operation indication signal TX3 activated. At this time, the power management control circuit 415 may transmit the control signal CTRL indicating "busy" to the non-volatile memory devices STORAGE1 through STORAGE4.

When the main controller 310 transmits the write command "CMD Write D" including the data D to the fourth non-volatile memory device STORAGE4 through the first main channel CHA, the fourth controller 414-4 of the fourth non-volatile memory device STORAGE4 may store the data D in a data buffer (not shown) of the fourth non-volatile memory device STORAGE4.

Thereafter, when the main controller 310 transmits a program command, e.g., the program confirm command "CMD PGM" to the fourth non-volatile memory device STORAGE4, the fourth controller 414-4 does not program the data D that has been stored in the data buffer of the fourth non-volatile memory device STORAGE4 to a memory cell array included in one of the memory chips NAND included in the fourth non-volatile memory device STORAGE4 but remains in the idle state in response to the operation control signal RX activated and/or the control signal CTRL indicating "busy".

When the program operation is completed in the second non-volatile memory device STORAGE2 while the fourth non-volatile memory device STORAGE4 is in the idle state, the second controller 414-2 of the second non-volatile memory device STORAGE2 may output the second operation indication signal TX2 deactivated to indicate the completion of the program operation to the power management control circuit 415. The power management control circuit 415 may transmit the operation control signal RX deactivated and the control signal CTRL for controlling the start of the operation of the fourth non-volatile memory device STORAGE4 to the non-volatile memory devices STORAGE1 through STORAGE4 in response to the second operation indication signal TX2 deactivated.

The fourth controller 414-4 of the fourth non-volatile memory device STORAGE4 may program the data D that has been stored in the data buffer of the fourth non-volatile memory device STORAGE4 to the memory cell array included in one of the memory chips NAND included in the fourth non-volatile memory device STORAGE4 in response to the operation control signal RX deactivated and the control signal CTRL for controlling the start of the operation of the fourth non-volatile memory device STORAGE4. While the data D is being programmed, the fourth controller 414-4 may output a fourth operation indication signal TX4 activated to indicate that the program operation is being performed in the fourth non-volatile memory device STORAGE4 to the power management control circuit 415.

The power management control circuit 415 may transmit the operation control signal RX activated to the non-volatile memory devices STORAGE1 through STORAGE4 in response to the fourth operation indication signal TX4 activated. In other words, when the maximum value or the reference value is 2, the power management control circuit 415 may generate the operation control signal RX activated in response to the third operation indication signal TX3 activated and the fourth operation indication signal TX4 activated. At this time, the power management control circuit 415 may transmit the control signal CTRL indicating "busy" to the non-volatile memory devices STORAGE1 through STORAGE4.

A value of "1" included in the control signal CTRL may be a signal indicating the operation of the first non-volatile memory device STORAGE1. A value of "2" included in the control signal CTRL may be a signal indicating the operation of the second non-volatile memory device STORAGE2. A value of "3" included in the control signal CTRL may be a signal indicating the operation of the third non-volatile memory device STORAGE3. A value of "4" included in the control signal CTRL may be a signal indicating the operation of the fourth non-volatile memory device STORAGE4.

Referring to FIG. 7, state information STS may include the operation control signal RX and the control signal CTRL. As described above, the state information STS may be used to determine whether each of non-volatile memory devices included in the memory cluster 400 is operating, the order in which the non-volatile memory devices operate, and/or a maximum number of non-volatile memory devices that can be operated at a time.

In the embodiments of the disclosure, "state information (or state signal) related to an operation indication signal" may be state information itself output from a current operating non-volatile memory device as described with reference to FIG. 2 or may be the state information STS generated by the power management control circuit 415 based on an operation indication signal TXi (where "i" is 1, 2, 3, or 4) as described above with reference to FIG. 4.

When the memory cluster 400 includes only one power management control circuit 415, the power management control circuit 415 may transmit the state information STS to each of the non-volatile memory devices connected to each of the main channels CHA, CHB, and CHC in response to an operation indication signal output from any non-volatile memory device. One of the non-volatile memory devices connected to the first main channel CHA and one of the non-volatile memory devices connected to another main channel CHB or CHC may be operated simultaneously or in parallel in the memory cluster 400. Referring to FIG. 4, the power management control circuit 415 may be implemented as an independent circuit.

Referring to FIG. 5, the power management control circuit 415 may be formed in a main controller 310A. Apart from the power management control circuit 415, the structure and operations of the main controller 310A illustrated in FIG. 5 are substantially the same as or similar to those of the main controller 310 illustrated in FIG. 1. In other words, the first cluster 410B-1 may include the managed non-volatile memory devices 412-1 through 412-4.

Referring to FIG. 6, the power management control circuit 415 may be formed in one non-volatile memory device (e.g., 412-4A) among a plurality of non-volatile memory devices. Apart from the power management control circuit 415, the structure and operations of a fourth non-volatile memory device 412-4A illustrated in FIG. 6 are substantially the same as or similar to those of the fourth non-volatile memory device 412-4 illustrated in FIG. 4. In other words, the first cluster 410B-2 may include the managed non-volatile memory devices 412-1 through 412-3 and 412-4A.

When the signals TXi, RX, and CTRL are bidirectional, they may be implemented in a single signal. At this time, "i" may be 1, 2, 3, and 4.

Figure 8:
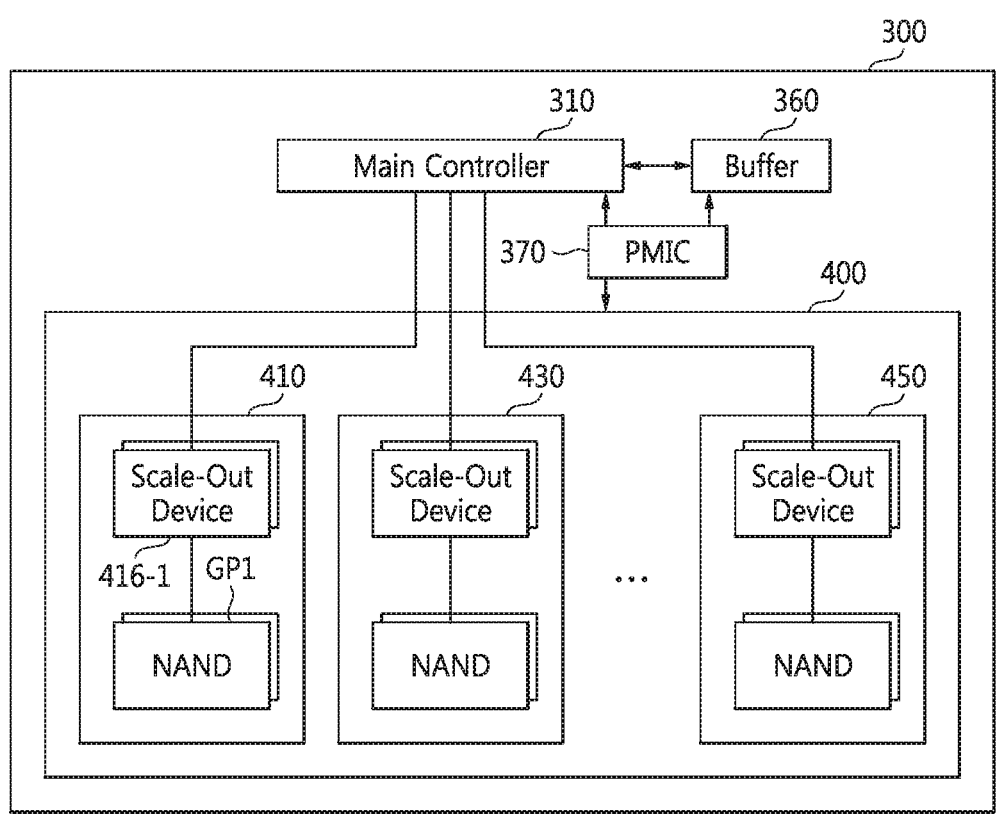
FIG. 8 is a detailed block diagram of a data storage device illustrated in FIG. 1 according to some embodiments of the disclosure.
Figure 9:
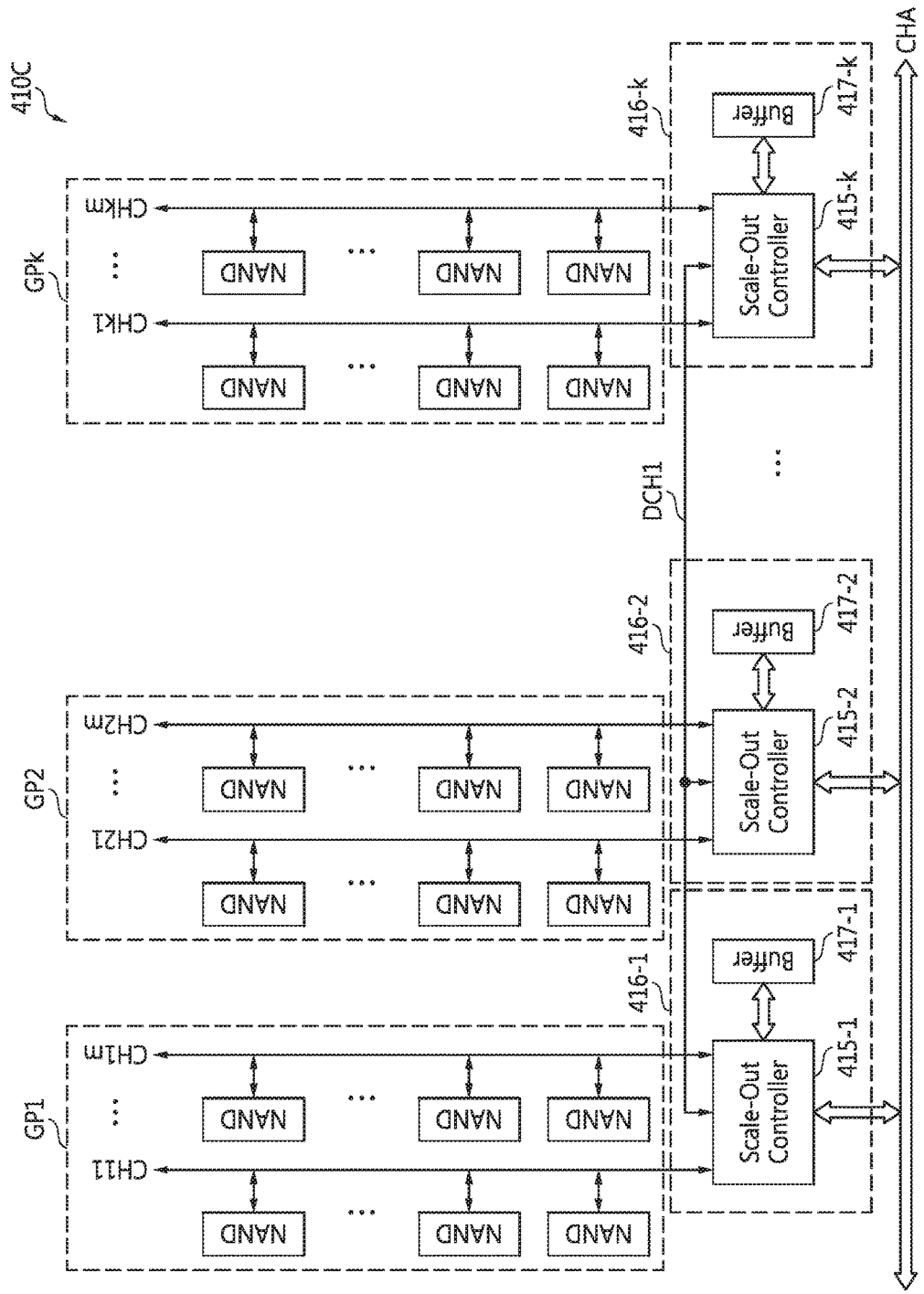
FIG. 9 is a block diagram of a first cluster illustrated in FIG. 8 according to some embodiments of the disclosure.

FIG. 8 is a detailed block diagram of the data storage device 300 illustrated in FIG. 1 according to some embodiments of the disclosure. FIG. 9 is a block diagram of an example 410C of the first cluster 410 illustrated in FIG. 8. The data storage device 300 illustrated in FIG. 8 may have a scale-out architecture. The first cluster 410 may include at least one scale-out device 416-1 and a first non-volatile memory device group GP1. The structure of each of the other clusters 430 and 450 is substantially the same as or similar to that of the first cluster 410. Since the structure and operations are substantially the same or similar among the clusters 410, 430, and 450, the structure and operation of the first cluster 410C will be representatively described with reference to FIGS. 1, 8, and 9.

The first cluster 410C may include scale-out devices 416-1 through 416-k (where "k" is a natural number of at least 3) and non-volatile memory device groups GP1 through GPk. The scale-out devices 416-1 through 416-k may include scale-out controllers 415-1 through 415-k, respectively, and volatile memories 417-1 through 417-k, respectively. The scale-out controllers 415-1 through 415-k may communicate state information, which has been described above in detail, with one another through a dedicated channel DCH1.

The first scale-out controller 415-1 may be connected to the first main channel CHA, channels CH11 through CH1m (where "m" is a natural number of at least 2), and the first volatile memory 417-1. A plurality of non-volatile memory devices NAND may be connected to each of the channels CH11 through CH1m. The non-volatile memory devices NAND may be NAND-type flash memories or managed NAND flash memory devices but are not restricted thereto. The first scale-out controller 415-1 may control the operation of the non-volatile memory devices NAND through the channels CH11 through CH1m. The main controller 310 may control the operation of the first scale-out controller 415-1.

The first volatile memory 417-1 may include a first region to store logical address-to-physical address mapping information (or mapping table) regarding the non-volatile memory devices NAND connected to each of the channels CH11 through CH1m. The first volatile memory 417-1 may also include a second region (or a cache region) to temporarily store data to be written to at least one of the non-volatile memory devices NAND connected to each of the channels CH11 through CH1m or data output from at least one of the non-volatile memory devices NAND connected to each of the channels CH11 through CH1m.

The second scale-out controller 415-2 may be connected to the first main channel CHA, channels CH21 through CH2m, and the second volatile memory 417-2. A plurality of non-volatile memory devices NAND may be connected to each of the channels CH21 through CH2m. The first scale-out controller 415-2 may control the operation of the non-volatile memory devices NAND through the channels CH21 through CH2m. The main controller 310 may control the operation of the second scale-out controller 415-2.

The second volatile memory 417-2 may include a first region to store logical address-to-physical address mapping information (or mapping table) regarding the non-volatile memory devices NAND connected to each of the channels CH21 through CH2m. The second volatile memory 417-2 may also include a second region (or a cache region) to temporarily store data to be written to at least one of the non-volatile memory devices NAND connected to each of the channels CH21 through CH2m or data output from at least one of the non-volatile memory devices NAND connected to each of the channels CH21 through CH2m.

The k-th scale-out controller 415-k may be connected to the first main channel CHA, channels CHk1 through CHkm, and the k-th volatile memory 417-k. A plurality of non-volatile memory devices NAND may be connected to each of the channels CHk1 through CHkm. The k-th scale-out controller 415-k may control the operation of the non-volatile memory devices NAND through the channels CHk1 through CHkm. The main controller 310 may control the operation of the k-th scale-out controller 415-k.

The k-th volatile memory 417-k may include a first region to store logical address-to-physical address mapping information (or mapping table) regarding the non-volatile memory devices NAND connected to each of the channels CHk1 through CHkm. The k-th volatile memory 417-k may also include a second region (or a cache region) to temporarily store data to be written to at least one of the non-volatile memory devices NAND connected to each of the channels CHk1 through CHkm or data output from at least one of the non-volatile memory devices NAND connected to each of the channels CHk1 through CHkm.

Each of the volatile memories 417-1 through 417-k may be a buffer or a buffer memory and it may be implemented using RAM, SRAM, or DRAM. However, the disclosure is not restricted to the current embodiments. The scale-out controllers 415-1 through 415-k may communicate an operation indication signal with one another through the dedicated channel DCH1.

The non-volatile memory devices NAND connected to each of the channels CH11 through CH1m may communicate an operation indication signal and state information with the first scale-out controller 415-1. The first scale-out controller 415-1 may perform functions substantially the same as or similar to those performed by the control circuit 413-1 illustrated in FIG. 2. For instance, the first scale-out controller 415-1 may include a power control circuit (426 in FIG. 13) which can perform functions substantially the same as or similar to those performed by the control circuit 413-1 illustrated in FIG. 2.

The non-volatile memory devices NAND connected to each of the channels CH21 through CH2m may communicate an operation indication signal and state information with the second scale-out controller 415-2. The second scale-out controller 415-2 may perform functions substantially the same as or similar to those performed by the control circuit 413-2 illustrated in FIG. 2. For instance, the second scale-out controller 415-2 may include a power control circuit which can perform functions substantially the same as or similar to those performed by the control circuit 413-2 illustrated in FIG. 2.

The non-volatile memory devices NAND connected to each of the channels CHk1 through CHkm may communicate an operation indication signal and state information with the k-th scale-out controller 415-k. When it is assumed that "n" in FIG. 2 is the same as "k" in FIG. 8, the k-th scale-out controller 415-k may perform functions substantially the same as or similar to those performed by the control circuit 413-n illustrated in FIG. 2. For instance, the k-th scale-out controller 415-k may include a power control circuit which can perform functions substantially the same as or similar to those performed by the control circuit 413-n illustrated in FIG. 2.

Alternatively, one of the scale-out controllers 415-1 through 415-k may perform functions substantially the same as or similar to those performed by the power management control circuit 415 illustrated in FIG. 4. For instance, one of the scale-out controllers 415-1 through 415-k may include the power control circuit 426 which can perform functions substantially the same as or similar to those performed by the power management control circuit 415 illustrated in FIG. 4.

Although the non-volatile memory device groups GP1 through GPk include the same number of channels as one another in the embodiments illustrated in FIG. 9, the non-volatile memory device groups GP1 through GPk may include different numbers of channels from one another.

Referring to FIGS. 1, 7, and 9, it is assumed that the data storage device 300 includes the clusters 410, 430, and 450 and the structure of each of the clusters 410, 430, and 450 is substantially the same as or similar to that of the first cluster 410C. It is assumed that maximum power that the PMIC 370 of the data storage device 300 is able to supply (for a program operation) is the same as the power consumed when program operations are performed simultaneously in two of non-volatile memory devices.

Two non-volatile memory devices selected from among a plurality of non-volatile memory devices connected to the channel CH11 in the memory cluster 400 may operate simultaneously or in parallel according to the control of the first scale-out controller 415-1. As an alternative, one of the non-volatile memory devices connected to the channel CH11 in the memory cluster 400 and one of the non-volatile memory devices connected to the channel CH1m may operate simultaneously or in parallel according to the control of the first scale-out controller 415-1. As another alternative, a non-volatile memory device selected from among the non-volatile memory devices connected to any one of the channels CH11 through CH1m according to the control of the first scale-out controller 415-1 and a non-volatile memory device selected from among the non-volatile memory devices connected to any one of the channels CH21 through CH2m according to the control of the second scale-out controller 415-2 may operate simultaneously or in parallel.

As described above with reference to FIG. 7, an operation indication signal output from each of all non-volatile memory devices included in the memory cluster 400 may be input to at least one of the scale-out controllers 415-1 through 415-k and an operation control signal and a control signal output from at least one of the scale-out controllers 415-1 through 415-k may be transmitted to all of the non-volatile memory devices through at least one of the scale-out controllers 415-1 through 415-k. Accordingly, one of the non-volatile memory devices connected to the first main channel CHA and one of the non-volatile memory devices connected to another main channel CHB or CHC may operate simultaneously or in parallel in the memory cluster 400.

Figure 10:
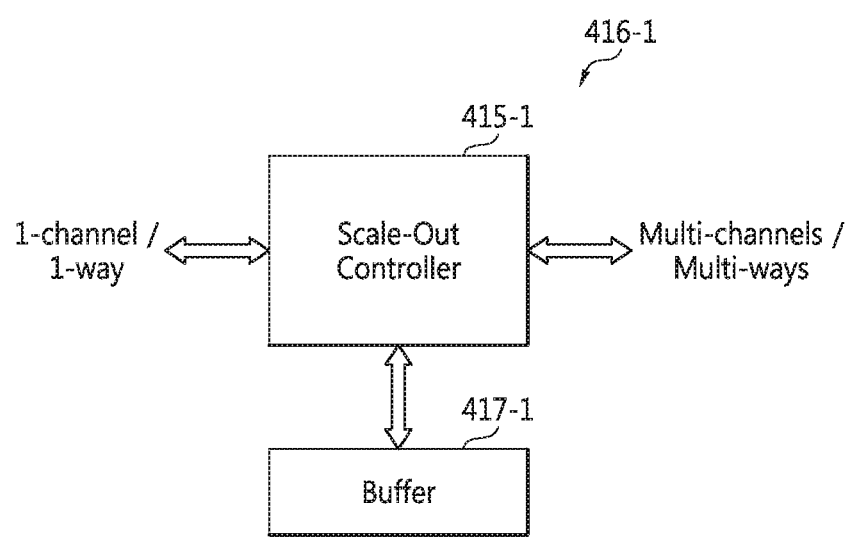
FIG. 10 is a schematic diagram of a first scale-out device illustrated in FIG. 9.
Figure 13:
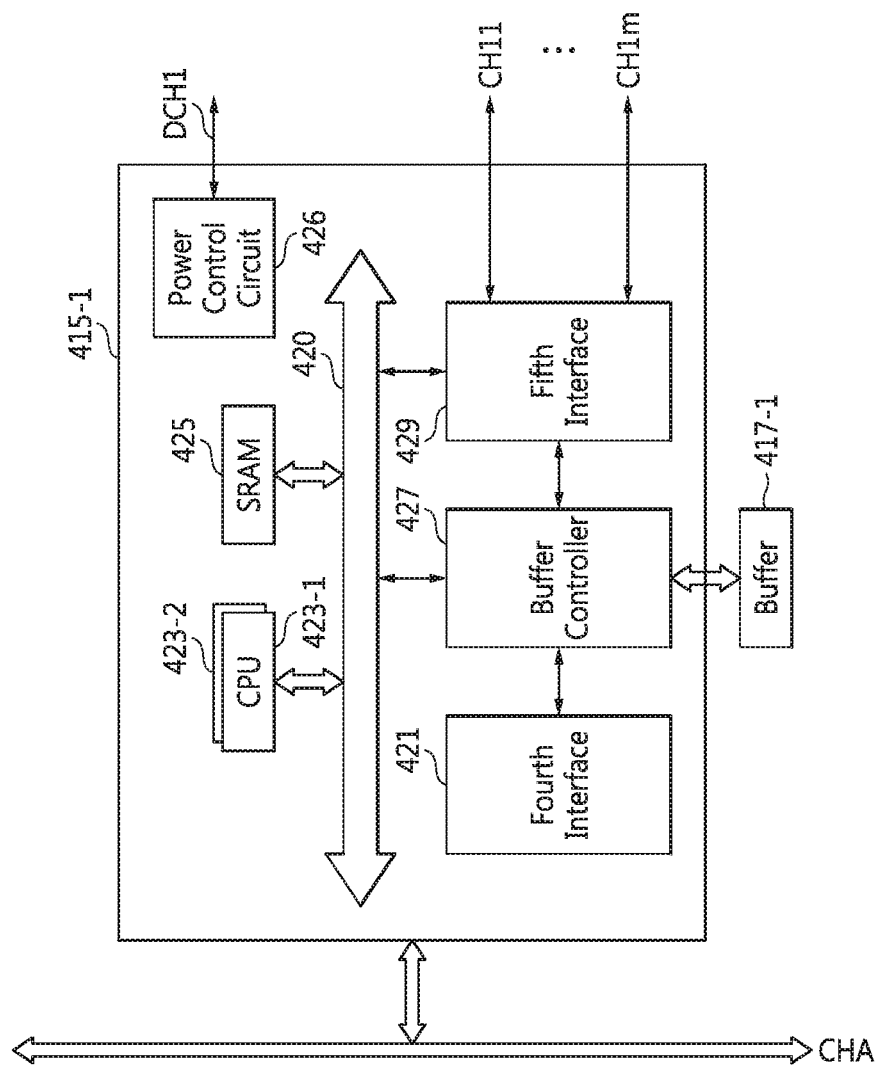
FIG. 13 is a block diagram of a first scale-out controller illustrated in FIG. 10.

FIG. 10 is a schematic diagram of the first scale-out device 416-1 illustrated in FIG. 9. FIG. 13 is a block diagram of the first scale-out controller 415-1 illustrated in FIG. 10. Referring to FIG. 1, FIGS. 8 through 10, and FIG. 13, the structure and operations are substantially the same or similar among the scale-out controllers 415-1 through 415-k, and therefore, the structure and operations of the first scale-out controller 415-1 will be described representatively.

The first scale-out controller 415-1 may control transmission of commands and/or data transferred among the main controller 310, the first volatile memory 417-1, and the non-volatile memory devices NAND in the first non-volatile memory device group GP1. The first scale-out controller 415-1 may be implemented as an IC or an SoC.

The first scale-out controller 415-1 may include bus architecture 420, a fourth interface 421, at least one CPU 423-1 and/or 423-2, an internal memory 425, a power control circuit 426, a buffer controller 427, and a fifth interface 429. The bus architecture 420 may be implemented as AMBA, AHB, APB, AXI, ASB, ACE, or a combination thereof, but the disclosure is not restricted to these examples.

The fourth interface 421 may change the format of a response and/or data to be transmitted to the main controller 310 and may transmit the response and/or data in a changed format to the main controller 310 through the first main channel CHA. The fourth interface 421 may also receive a command and/or data from the main controller 310, change the format of the command and/or data, and transmit the command and/or data in a changed format to the at least one CPU 423-1 and/or 423-2 and/or the buffer controller 427. The fourth interface 421 may include a transceiver which transmits and receives a signal and/or data.

The structure and operations of the fourth interface 421 may be configured to be compatible with those of the third interface 350. The fourth interface 421 may be SATA interface, SATAe interface, SAS, PCIe interface, NVMe interface, AHCI, MMC interface, NAND-type flash memory interface, or NOR-type flash memory interface, but it is not restricted thereto. The fourth interface 421 may be connected to a channel (or a main channel) or a way.

The at least one CPU 423-1 and/or 423-2 may control the fourth interface 421, the internal memory 425, the buffer controller 427, and the fifth interface 429 through the bus architecture 420. Each of the CPUs 423-1 and 423-2 may include at least one core.

The first CPU 423-1 may communicate data with the third interface 350 via the fourth interface 421 and the second CPU 423-2 may communicate data with at least one of the non-volatile memory devices NAND connected to each of the channels CH11 through CH1m via the fifth interface 429. The first CPU 423-1 and the second CPU 423-2 may form a multi-CPU. The first CPU 423-1 may control the second CPU 423-2.

The internal memory 425 may store data necessary for the operations of the first scale-out controller 415-1 or data generated from a data processing operation (e.g. a write or read operation) performed by the first scale-out controller 415-1. The internal memory 425 may store a second FTL code that can be executed by the CPU 423-1 and/or 423-2. When the data storage device 300 is booted, the second FTL code may be loaded from the memory cluster 400 to the internal memory 425. The internal memory 425 may be implemented as RAM, DRAM, SRAM, buffer, buffer memory, cache, or TCM, but the disclosure is not restricted to these examples.

The power control circuit 426 of the first scale-out controller 415-1, which communicates data with the scale-out controllers 415-2 through 415-k through the dedicated channel DCH1, may perform the functions of the control circuit (e.g., 413-1) illustrated in FIG. 2 or the functions of the power management control circuit 415 illustrated in FIG. 4.

The buffer controller 427 may write data to or read data from the first volatile memory 417-1 according to the control of the first or second CPU 423-1 or 423-2. The buffer controller 427 may control the write and read operations on the first volatile memory 417-1 and may be called a buffer manager.

The fifth interface 429 may control a data processing operation on the non-volatile memory devices NAND through one of the channels CH11 through CH1m according to the control of the first or second CPU 423-1 or 423-2.

Referring to FIGS. 10 and 13, a plurality of channels and/or ways may be connected to the fifth interface 429. The fifth interface 429 may be SATA interface, SATAe interface, SAS, PCIe interface, NVMe interface, AHCI, MMC interface, NAND-type flash memory interface, or NOR-type flash memory interface, but it is not restricted thereto.

The first volatile memory 417-1 may include a first region which stores a mapping table for logical address-to-physical address translation with respect to the non-volatile memory devices NAND included in the first non-volatile memory device group GP1 and a second region which functions as a cache, but the disclosure is not restricted to the current embodiments. The second FTL code executed by the at least one CPU 423-1 and/or 423-2 may perform logical address-to-physical address translation using the mapping table stored in the first region.

When each of the non-volatile memory devices NAND described with reference to FIG. 1 and FIGS. 8 through 10 is replaced with the first scale-out device 416-1 including the first scale-out controller 415-1 and the first volatile memory 417-1, the scalability of memory capacity of the memory cluster 400 will increase.

Figure 11:
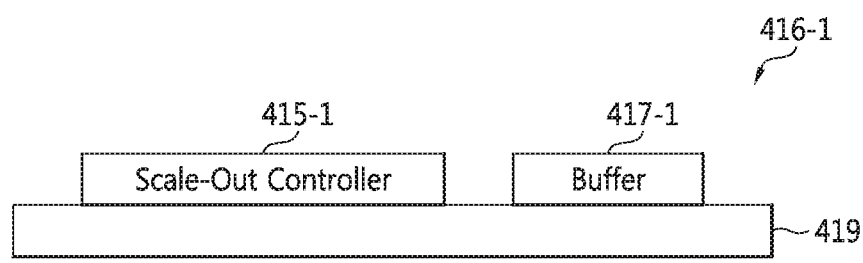
FIG. 11 is a diagram of a semiconductor package of the first scale-out device illustrated in FIG. 10 according to some embodiments of the disclosure.

FIG. 11 is a diagram of a semiconductor package of the first scale-out device 416-1 illustrated in FIG. 10 according to some embodiments of the disclosure. Referring to FIGS. 10 and 11, the first scale-out device 416-1 may be formed in a semiconductor package. In detail, the first scale-out device 416-1 may include the first scale-out controller 415-1 and the first volatile memory 417-1 which are attached or mounted on a semiconductor substrate 419.

The first scale-out controller 415-1 may be attached on the semiconductor substrate 419 in a flip-chip structure. When the first scale-out controller 415-1 is attached on the semiconductor substrate 419 using an adhesive material, the first scale-out controller 415-1 may transmit or receive electrical signals to or from the semiconductor substrate 419 through bonding wires.

The first volatile memory 417-1 may also be attached to the semiconductor substrate 419 in a flip-chip structure. When the first volatile memory 417-1 is attached to the semiconductor substrate 419 using an adhesive material, the first volatile memory 417-1 may transmit or receive electrical signals to or from the semiconductor substrate 419 through bonding wires. In other words, the first scale-out controller 415-1 may communicate a command and/or data with the first volatile memory 417-1 via the semiconductor substrate 419.

Figure 12:
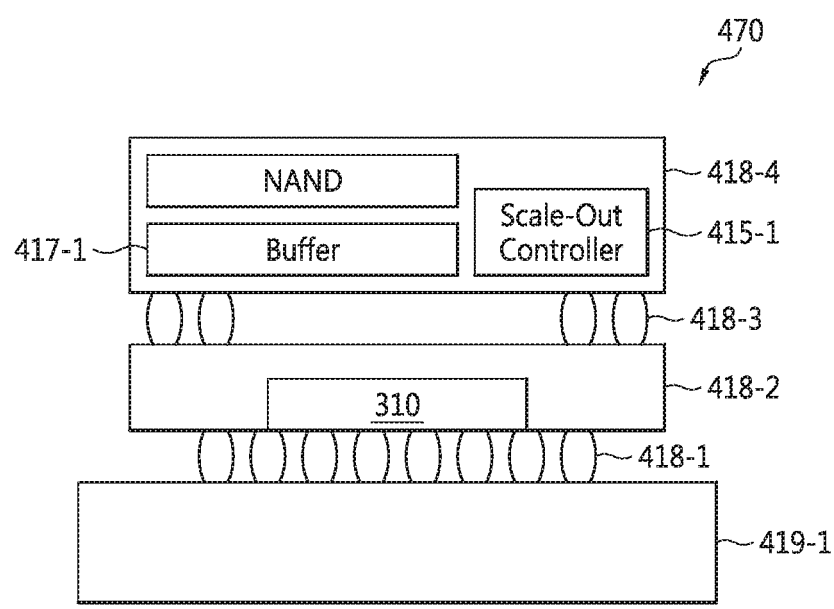
FIG. 12 is a diagram of a semiconductor package including a main controller and the first cluster illustrated in FIG. 1 according to some embodiments of the disclosure.

FIG. 12 is a diagram of a semiconductor package 470 including the main controller 310 and the first cluster 410 illustrated in FIG. 1 according to some embodiments of the disclosure. The semiconductor package 470 may be an embedded PoP (ePoP) but is not restricted thereto.

The semiconductor package 470 may include a semiconductor substrate 419-1, a first package 418-2 placed over the semiconductor substrate 419-1, and a second package 418-4 placed over the first package 418-2. The first package 418-2 may be bonded to the semiconductor substrate 419-1 using first bumps 418-1. The second package 418-4 may be bonded to the first package 418-2 using second bumps 418-3. The first package 418-2 may include the main controller 310. The second package 418-4 may include the first scale-out controller 415-1, the buffer 417-1, and at least one NAND-type flash memory.

Figure 14:
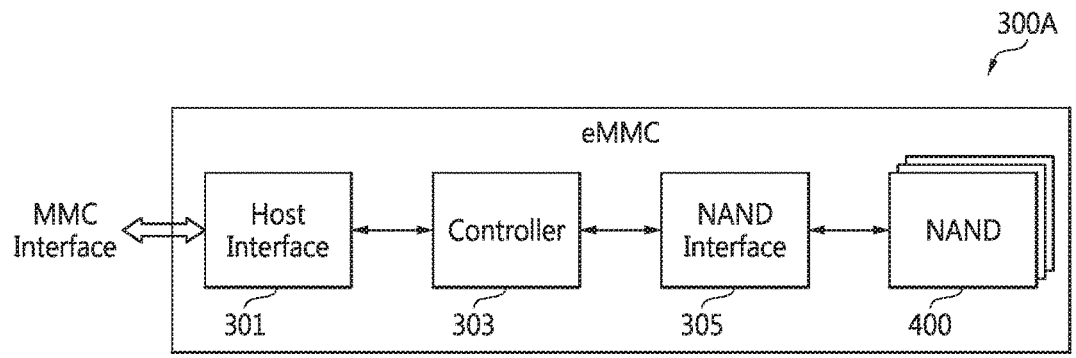
FIG. 14 is a block diagram of a data storage device according to other embodiments of the disclosure.

FIG. 14 is a block diagram of a data storage device 300A according to other embodiments of the disclosure. Referring to FIGS. 1 through 14, the data storage device 300A may be implemented as an eMMC. The data storage device 300A may include a host interface 301, a controller 303, a NAND interface 305, and the memory cluster 400.

The host interface 301 may control a command and/or data transferred between the controller 303 and a host. The host interface 301 may be connected to the host via an MMC interface.

The controller 303 may control the operation of the data storage device 300A. The structure including the controller 303 and the NAND interface 305 may be substantially the same as or similar to that of the main controller 310 illustrated in FIG. 1.

The controller 303 may control the operation of the memory cluster 400 via the NAND interface 305. The memory cluster 400 may include at least one cluster. The structure of the cluster may be substantially the same as or similar to that of the first cluster 410A illustrated in FIG. 2, the first cluster 410B illustrated in FIG. 4, or the first cluster 410C illustrated in FIG. 9.

Figure 15:
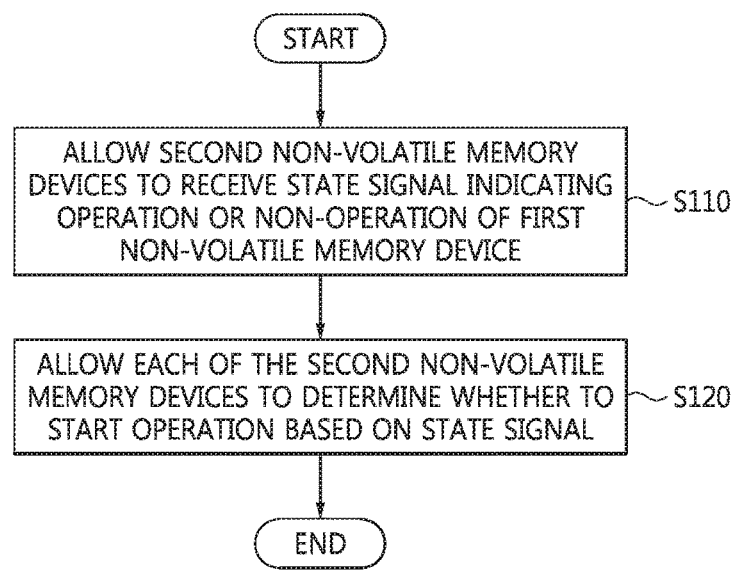
FIG. 15 is a flowchart of the operation of the first cluster illustrated in FIG. 1 according to some embodiments of the disclosure.

FIG. 15 is a flowchart of the operation of the first cluster 410 illustrated in FIG. 1 according to some embodiments of the disclosure. Referring to FIGS. 1 through 15, each of second non-volatile memory devices include in the memory cluster 400 may receive state information indicating operation or non-operation of a first non-volatile memory device in operation S110. Each of the second non-volatile memory devices may determine whether to start operation or not in response to the state information in operation S120. The first non-volatile memory device may be a non-volatile memory device that is currently in operation and the second non-volatile memory devices may be non-volatile memory devices that are not currently in operation. Here, an operation may be a write operation, a read operation, or any other diverse operation consuming power.

Figure 16:
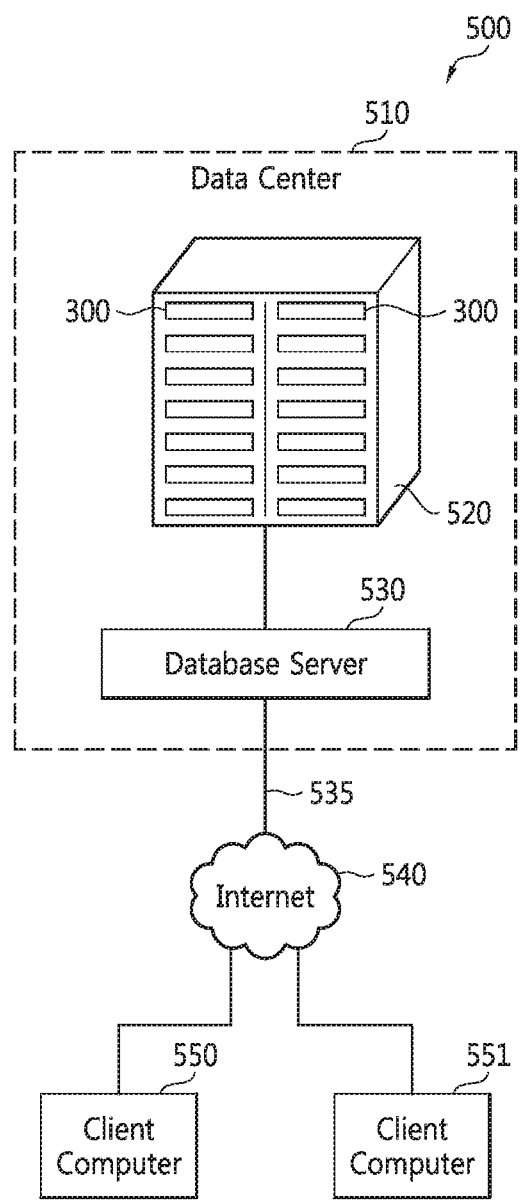
FIG. 16 is a block diagram of a data processing system according to other embodiments of the disclosure.

FIG. 16 is a block diagram of a data processing system 500 according to other embodiments of the disclosure. Referring to FIGS. 1 through 16, the data processing system 500 may include a database 520, a database server 530, a second network 540, and a plurality of client computers 550 and 551. The database 520 and the database server 530 may be included in a data center 510. The data center 510 may be an internet data center or a cloud data center.

The database 520 may include a plurality of data storage devices 300 or 300A. The data storage devices 300 may be installed in racks. The structure and operations of the data storage devices 300 are substantially the same as or similar to those of the data storage device 300 described above with reference to FIGS. 1 through 13.

The database server 530 may control the operations of each of the data storage devices 300. The database server 530 may be connected to the second network 540, e.g. an internet or Wi-Fi, via a first network 535, e.g. a local area network (LAN). The client computers 550 and 551 may be connected to the database server 530 via the second network 540.

As described above with reference to FIGS. 1 through 16, power consumption of each of non-volatile memory devices included in the data storage device 300 or 300A may be primarily controlled by each non-volatile memory device or by a scale-out device controlling each non-volatile memory device.

In a data storage device including non-volatile memory devices according to some embodiments of the disclosure, each of the non-volatile memory devices sends its current operation state to other non-volatile memory devices without intervention of a processor or a controller. The non-volatile memory devices communicating their current operation states with each other control the number of non-volatile memory devices that operate at the same time, thereby efficiently managing the maximum instantaneous power consumption of the data storage device.

In addition, a data storage device including a memory cluster efficiently manages its maximum instantaneous power consumption primarily using the memory cluster or non-volatile memory devices included in the memory cluster, thereby preventing unnecessary power consumption. Since the data storage device does not require the operation of a processor or a controller that controls maximum instantaneous power, the performance of the data storage device is increased.

While the disclosure has been particularly shown and described with reference to exemplary embodiments thereof, it will be understood by those of ordinary skill in the art that various changes in forms and details may be made therein without departing from the spirit and scope of the disclosure as defined by the following claims.

What is claimed is:

1. A method of operating a data storage device configured to control a plurality of non-volatile memory devices including a first non-volatile memory device and second non-volatile memory devices, the method comprising:
   receiving, by each of the second non-volatile memory devices, a state signal generated and communicated by the first non-volatile memory device that indicates operation or non-operation of the first non-volatile memory device;
   determining, by the each of the second non-volatile memory devices, whether to execute a program or read operation based on the state signal:,
   receiving, by a power management control circuit included in the data storage device, an operation indication signal output from the first non-volatile memory device;
   generating, by the power management control circuit, the state signal based on the operation indication signal; and
   transmitting, by the power management control circuit, the state signal to the each of the second non-volatile memory devices,
   wherein the generating the state signal comprises:
   counting, by the power management control circuit, a number of operation indication signals received from the non-volatile memory devices and generating a count value of the counted number; and
   comparing, by the power management control circuit, the count value with a reference value and generating the state signal having a state determined by a comparison result.

2. The method of claim 1, wherein the state signal indicates an order in which the second non-volatile memory devices operate.

3. The method of claim 1, wherein the state signal indicates a total number of non-volatile memory devices that can be operated at the same time among the plurality of non-volatile memory devices.

4. The method of claim 1, wherein the state signal is transmitted to the each of the second non-volatile memory devices through a dedicated channel.

5. The method of claim 4, wherein the state signal determines an order in which the second non-volatile memory devices operate.

6. The method of claim 1, wherein the power management control circuit generates:
   the state signal for maintaining at least some of the second non-volatile memory devices in an idle state when the count value becomes the same as the reference value as the operation indication signal is activated, and
   the state signal indicating a start of operation of one of the second non-volatile memory devices when the count value becomes less than the reference value as the operation indication signal is deactivated.

7. The method of claim 1, wherein at least one of the non-volatile memory devices comprises:
   a plurality of non-volatile memory chips; and
   a controller configured to access and manage the plurality of non-volatile memory chips.

8. A method of operating a data processing system which includes a data storage device, configured to control a plurality of non-volatile memory devices including a first non-volatile memory device and second non-volatile memory devices, and a host configured to control an operation of the data storage device, the method comprising:
   generating, by the first non-volatile memory device, a state signal;
   communicating, by the first non-volatile memory device, the state signal to the second non-volatile memory devices;
   determining, by each of the second non-volatile memory devices, at least one between: (1) whether to execute a program or read operation and (2) an operation order based on the state signal;
   generating, by a power management control circuit included in the first non-volatile memory device, the state signal based on an operation indication signal received from a controller of the first non-volatile memory device, the operation indication signal indicating a request to perform either a program operation or a read operation; and
   sending, with the power management control circuit, the state signal to the each of the second non-volatile memory devices through a dedicated channel,
   wherein the generating the state signal comprises:
   counting, with the power management control circuit, a number of operation indication signals received from the first non-volatile memory device and the second non-volatile memory devices to generate a count value;
   comparing, with the power management control circuit, the count value with a reference value; and
   generating, with the power management control circuit, the state signal having a state determined by a comparison result.

9. The method of claim 8, wherein the power management control circuit generates the:
   state signal for maintaining at least some of the second non-volatile memory devices in an idle state when the count value becomes the same as the reference value as the operation indication signal is activated, and
   state signal indicating a start of operation of one of the second non-volatile memory devices when the count value becomes less than the reference value as the operation indication signal is deactivated.

10. The method of claim 8, wherein at least one of the non-volatile memory devices comprises:
    a plurality of non-volatile memory chips; and a controller configured to access and manage the plurality of non-volatile memory chips.

11. A method executed by a power management control circuit, the method comprising:

receiving, from each of a plurality of first non-volatile memory devices, a first state signal indicating that the each of the plurality of first non-volatile memory devices has a pending read or program operation to perform;

outputting an operation inhibit signal to a second non-volatile memory device when a number of received first state signals exceeds a threshold value, the operation inhibit signal indicating that the second non-volatile memory device is inhibited from performing a read or program operation; and decrementing the number of received first state signals by one for every second state signal received from the first non-volatile memory devices indicating that one of the first non-volatile memory devices has completed its read or program operation.

12. The method of claim 11, further comprising outputting an operation control signal indicating which of the first non-volatile memory devices is permitted to perform its pending read or program operation.

13. The method of claim 12, wherein the operation control signal indicates a sequence in which multiple ones of the first non-volatile memory devices are permitted to perform their pending read or program operations.

14. The method of claim 11, further comprising outputting an operation enable signal to the second non-volatile memory device when the number of received first state signals does not exceed the threshold value, the operation enable signal indicating that the second non-volatile memory device is permitted to perform its read or program operation.

* * * * *